United States Patent
Chou et al.

(10) Patent No.: US 9,541,747 B2
(45) Date of Patent: Jan. 10, 2017

(54) ZOOM LENS

(71) Applicants: Yu-Hung Chou, Hsinchu (TW); Pei-Ching Liu, Hsinchu (TW)

(72) Inventors: Yu-Hung Chou, Hsinchu (TW); Pei-Ching Liu, Hsinchu (TW)

(73) Assignee: Young Optics Inc., Hsinchu (TW)

(*) Notice: Subject to any disclaimer, the term of this patent is extended or adjusted under 35 U.S.C. 154(b) by 62 days.

(21) Appl. No.: 14/140,472

(22) Filed: Dec. 25, 2013

(65) Prior Publication Data

US 2014/0320978 A1    Oct. 30, 2014

(30) Foreign Application Priority Data

Apr. 30, 2013   (TW) .............................. 102115468 A

(51) Int. Cl.
*G02B 15/177* (2006.01)
*G02B 15/16* (2006.01)
*G02B 15/28* (2006.01)

(52) U.S. Cl.
CPC ........... *G02B 15/177* (2013.01); *G02B 15/161* (2013.01); *G02B 15/28* (2013.01)

(58) Field of Classification Search
CPC ....... G02B 15/161; G02B 15/24; G02B 15/28; G02B 13/009; G02B 15/14; G02B 15/15; G02B 15/177
USPC ................................ 359/680–682, 690–691
See application file for complete search history.

(56) References Cited

U.S. PATENT DOCUMENTS

| 4,348,082 | A | 9/1982 | Ogawa |
| 6,931,207 | B2 * | 8/2005 | Nanba .............................. 396/72 |
| 7,061,687 | B2 | 6/2006 | Adachi |
| 7,405,885 | B2 | 7/2008 | Kang et al. |
| 7,489,452 | B2 | 2/2009 | Yamamoto et al. |
| 8,169,714 | B2 * | 5/2012 | Tochigi et al. ................ 359/691 |
| 2003/0206736 | A1 * | 11/2003 | Nishina ................ G02B 15/173 396/72 |
| 2006/0023320 | A1 * | 2/2006 | Kimura et al. ............... 359/689 |
| 2006/0034000 | A1 | 2/2006 | Ho et al. |
| 2008/0019021 | A1 * | 1/2008 | Kawakami et al. .......... 359/691 |
| 2010/0182677 | A1 | 7/2010 | Wang et al. |
| 2011/0037878 | A1 * | 2/2011 | Wakazono et al. ........ 348/240.3 |

(Continued)

FOREIGN PATENT DOCUMENTS

JP        2012242688        12/2012

OTHER PUBLICATIONS

"Office Action of Taiwan Counterpart Application", issued on May 12, 2015, p. 1-p. 5.

*Primary Examiner* — Jordan Schwartz

(74) *Attorney, Agent, or Firm* — Jianq Chyun IP Office

(57) ABSTRACT

A zoom lens including a first lens group and a second lens group is provided. Refractive powers of the first lens group and the second lens group are respectively negative and positive. The first lens group includes a first lens, a second lens, and a third lens arranged in sequence from an object side to an image side. The second lens group is disposed between the first lens group and the image side, and includes a fourth lens, a fifth lens, a sixth lens, a seventh lens, and an eighth lens arranged in sequence from the object side to the image side. The zoom lens satisfies $-2.4<f1/f_w<-1.0$, wherein f1 is the effective focal length of the first lens group, and $f_w$ is the effective focal length of the zoom lens at a wide end.

27 Claims, 24 Drawing Sheets

(56) References Cited

U.S. PATENT DOCUMENTS

| | | | |
|---|---|---|---|
| 2011/0157710 A1* | 6/2011 | Chou et al. ................... | 359/664 |
| 2012/0013996 A1* | 1/2012 | Okumura ...................... | 359/691 |
| 2012/0218646 A1* | 8/2012 | Kimura ......................... | 359/691 |
| 2013/0070123 A1* | 3/2013 | Imaoka ...................... | 348/240.3 |
| 2013/0100539 A1* | 4/2013 | Mitsuhashi .......... | G02B 15/173 |
| | | | 359/690 |
| 2013/0271849 A1* | 10/2013 | Hori .................... | G02B 15/173 |
| | | | 359/687 |
| 2013/0329121 A1* | 12/2013 | Ono .............................. | 348/345 |
| 2014/0078595 A1* | 3/2014 | Amano ........................ | 359/682 |
| 2014/0254027 A1* | 9/2014 | Amano ................. | G02B 13/18 |
| | | | 359/683 |

* cited by examiner

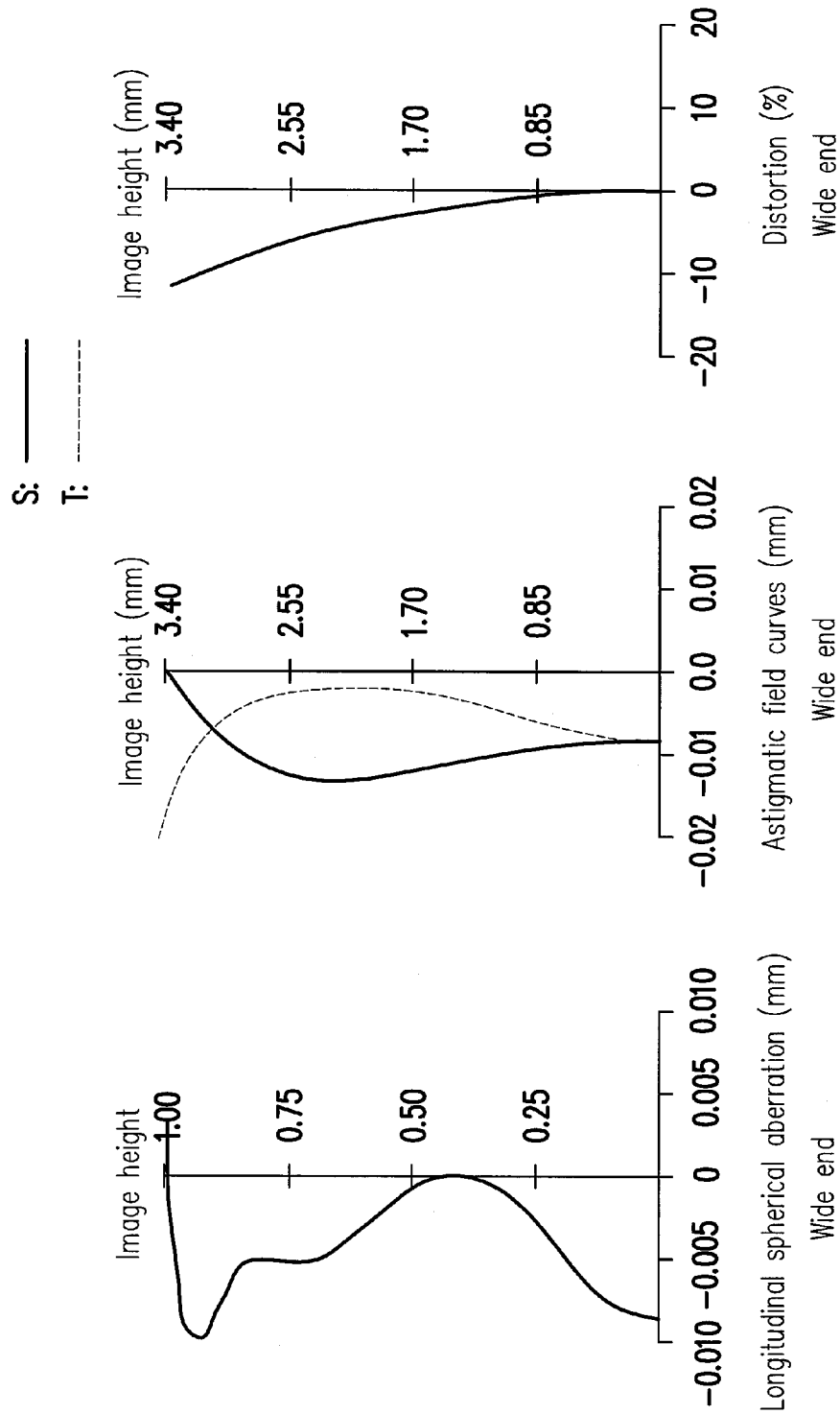

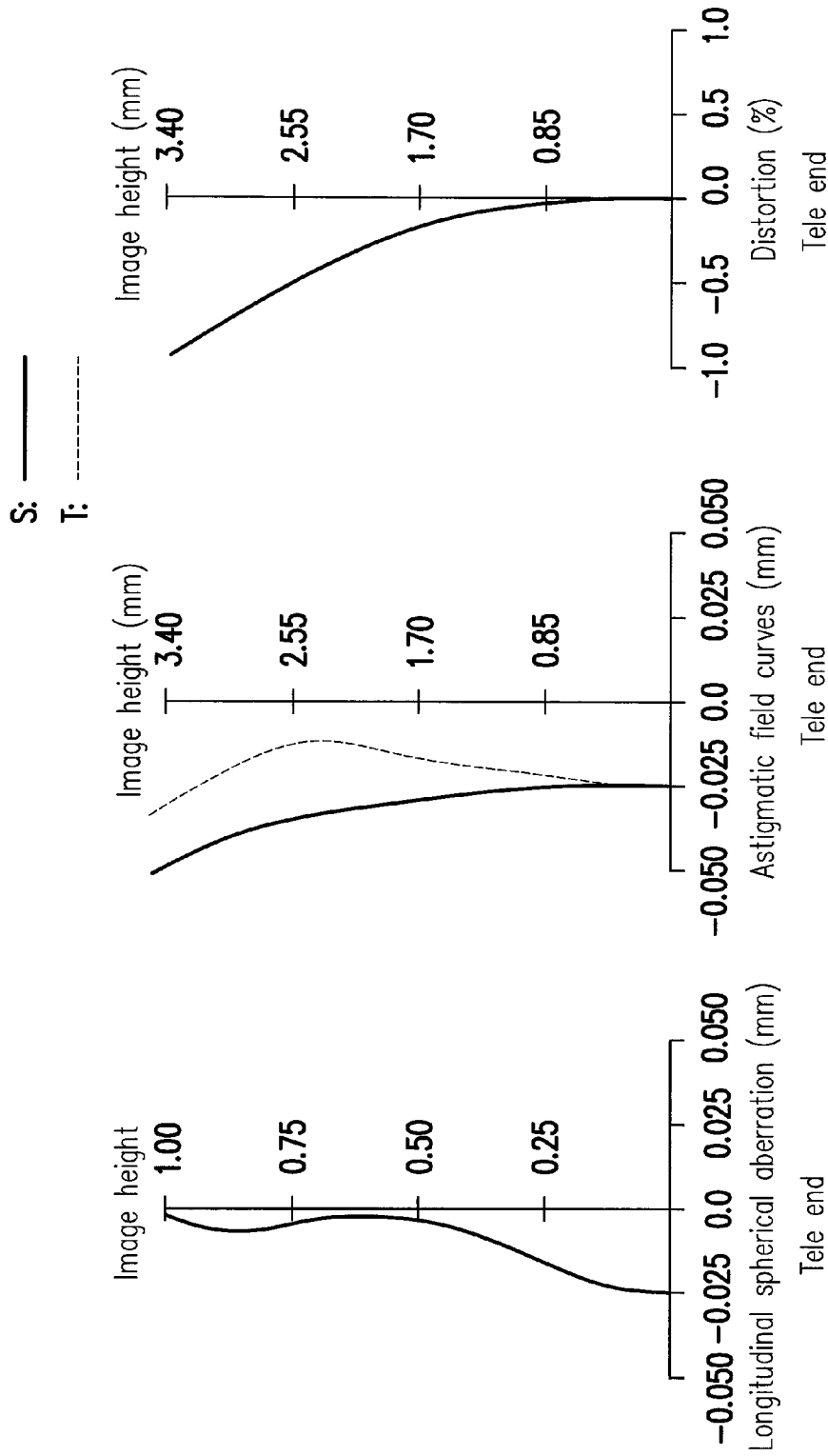

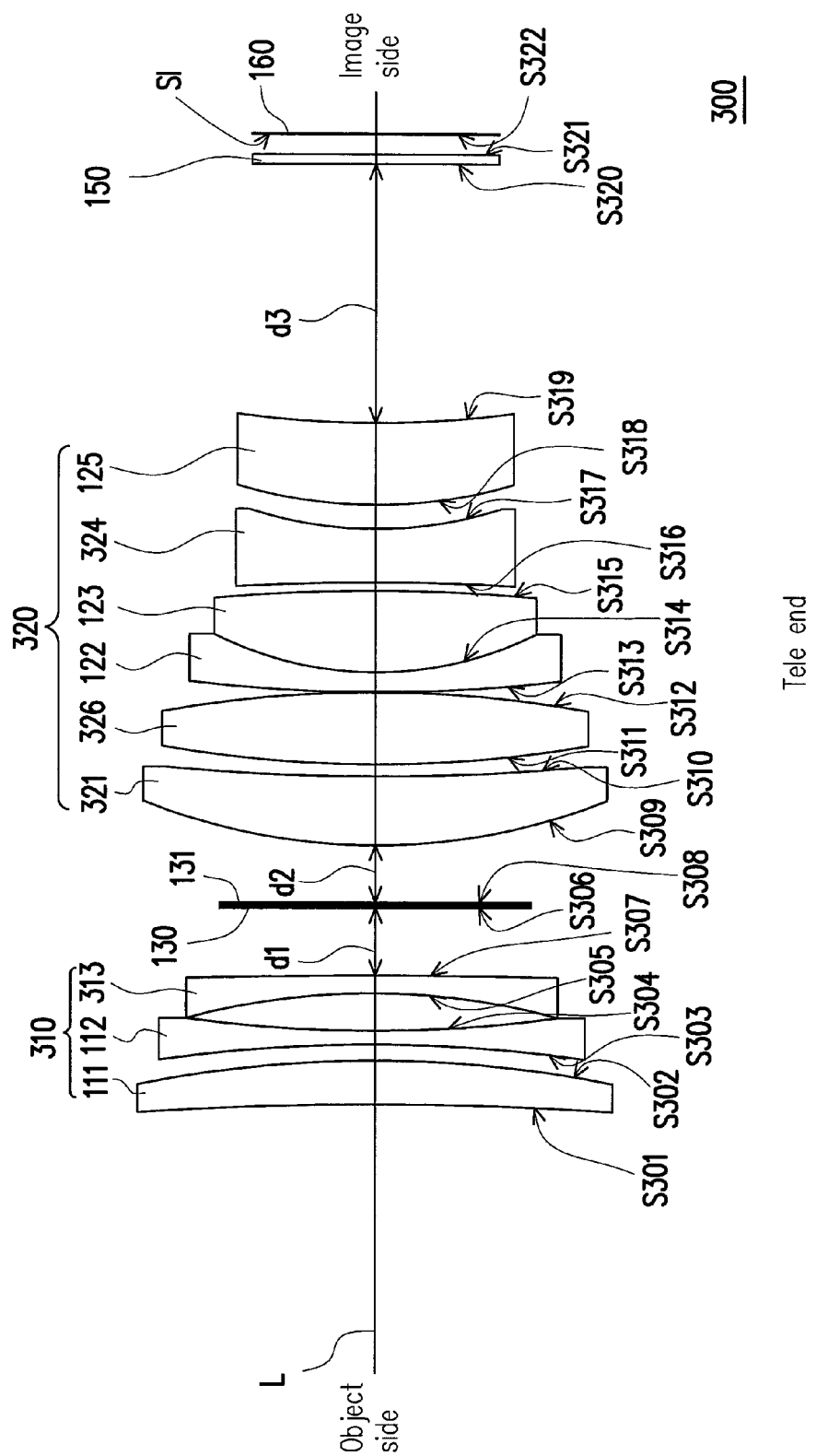
FIG. 3B Tele end

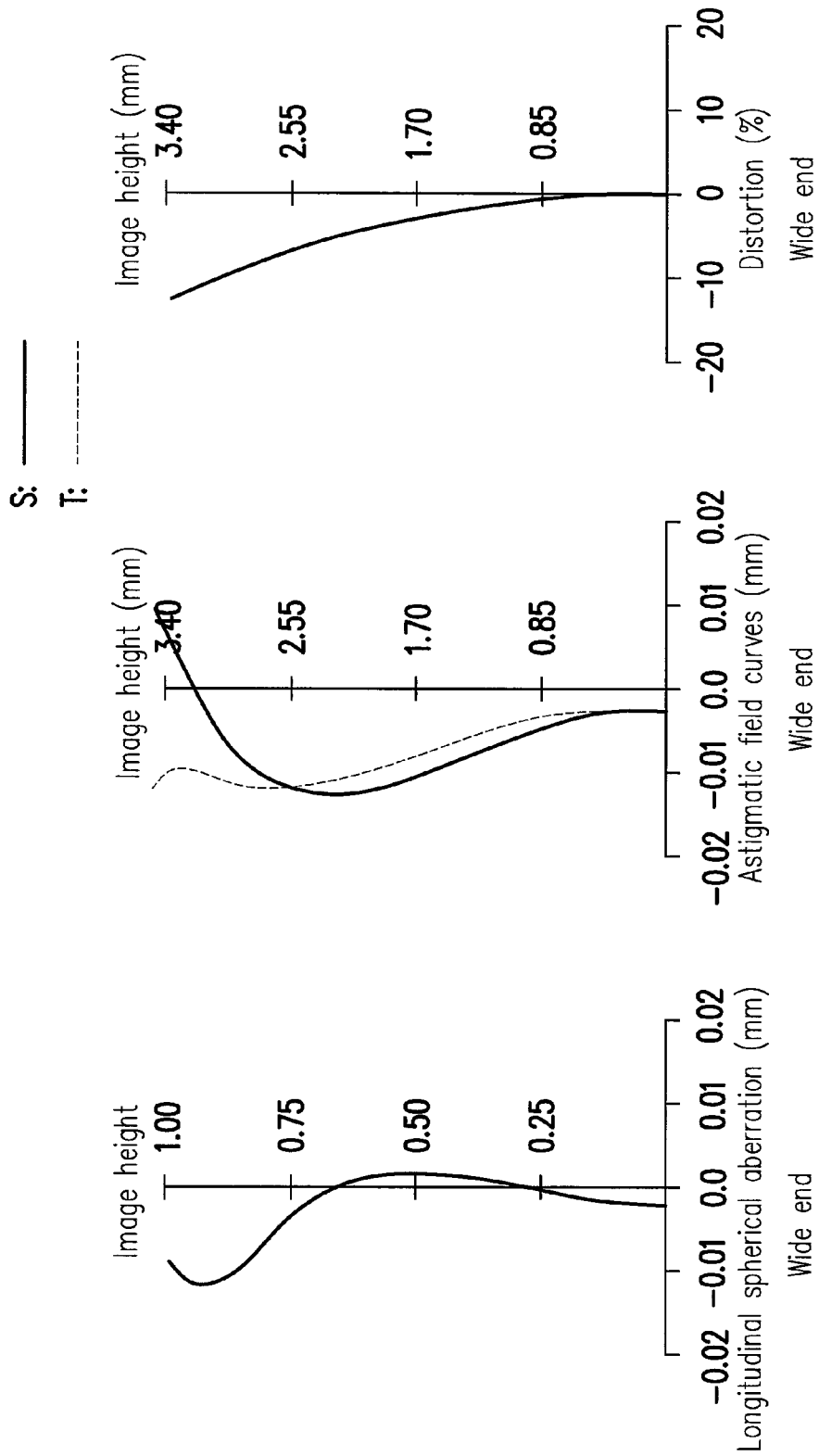

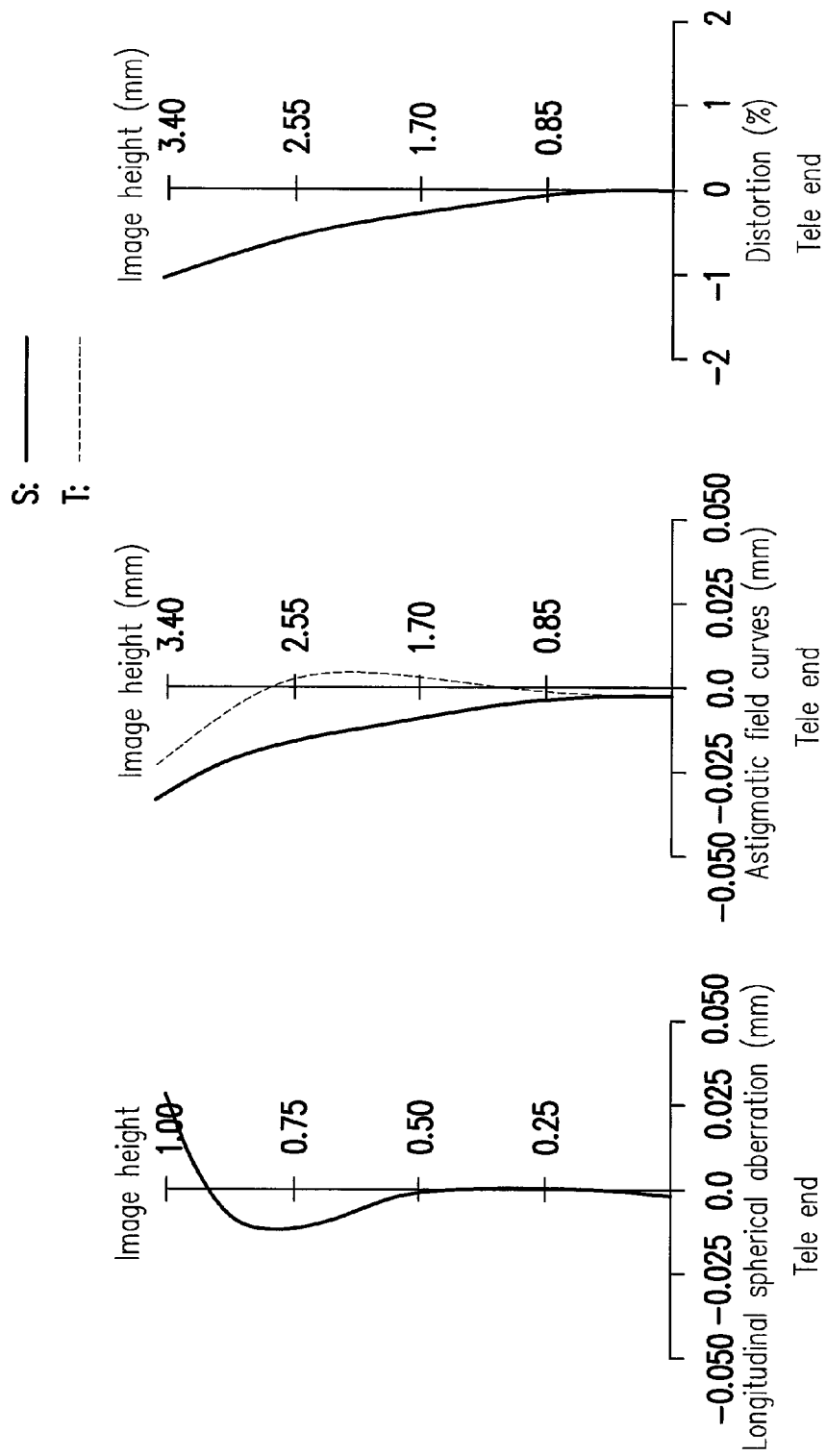

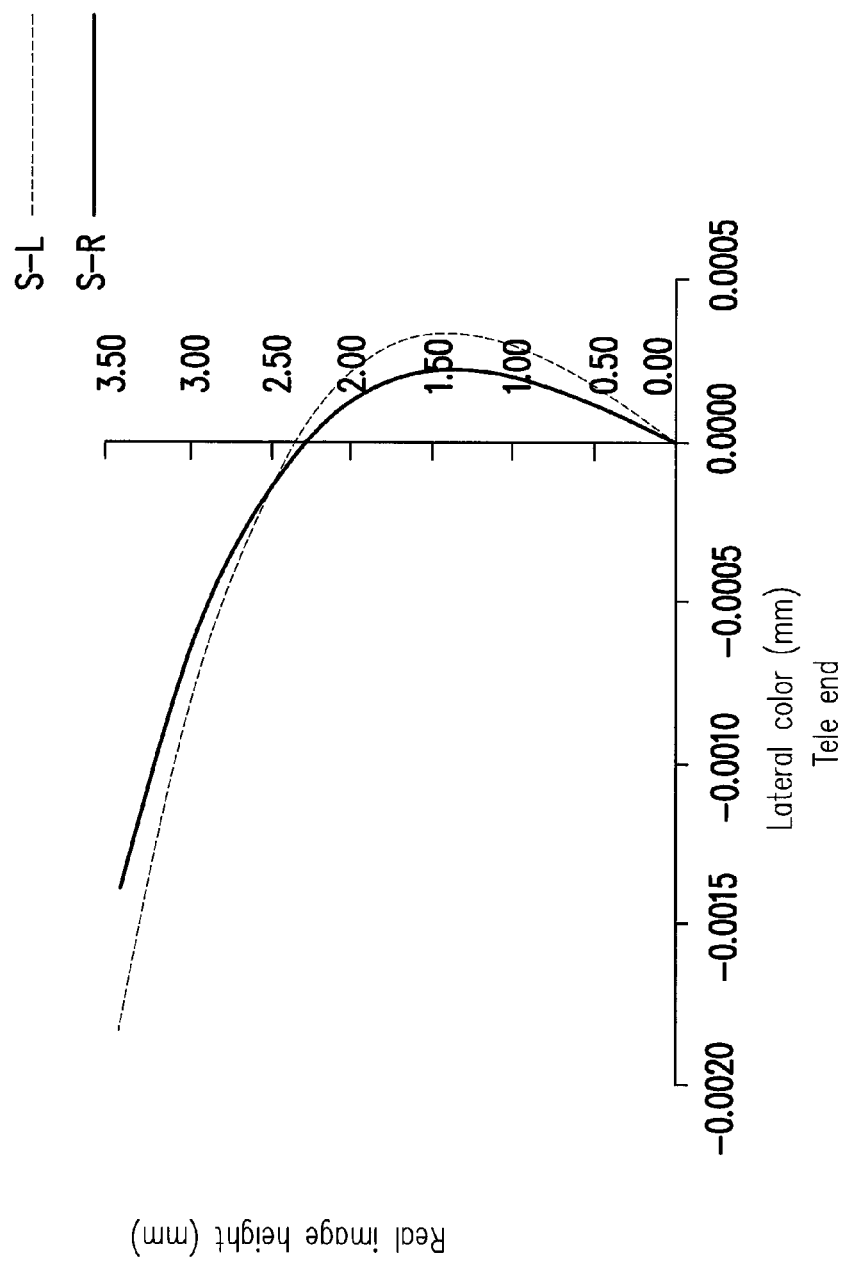

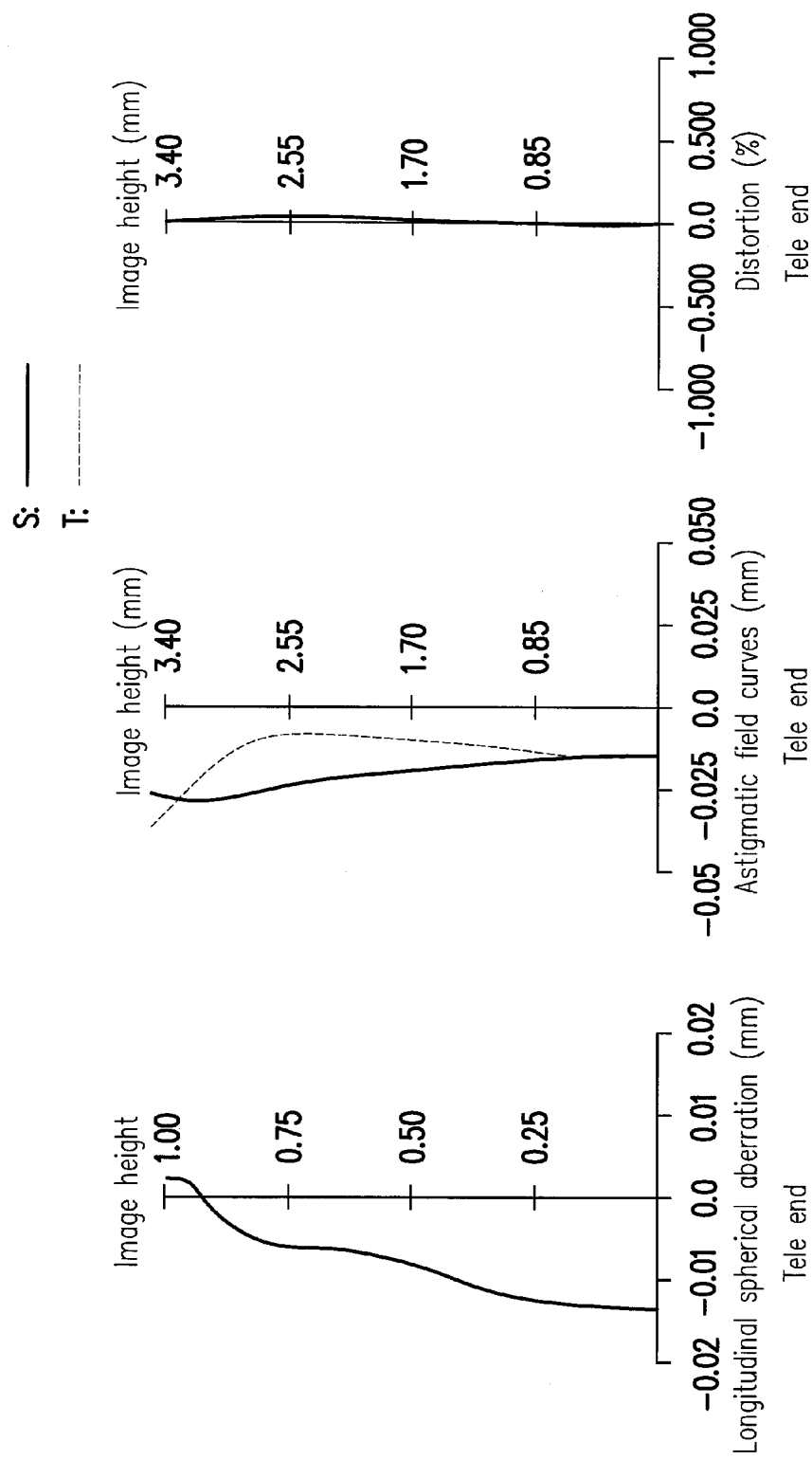

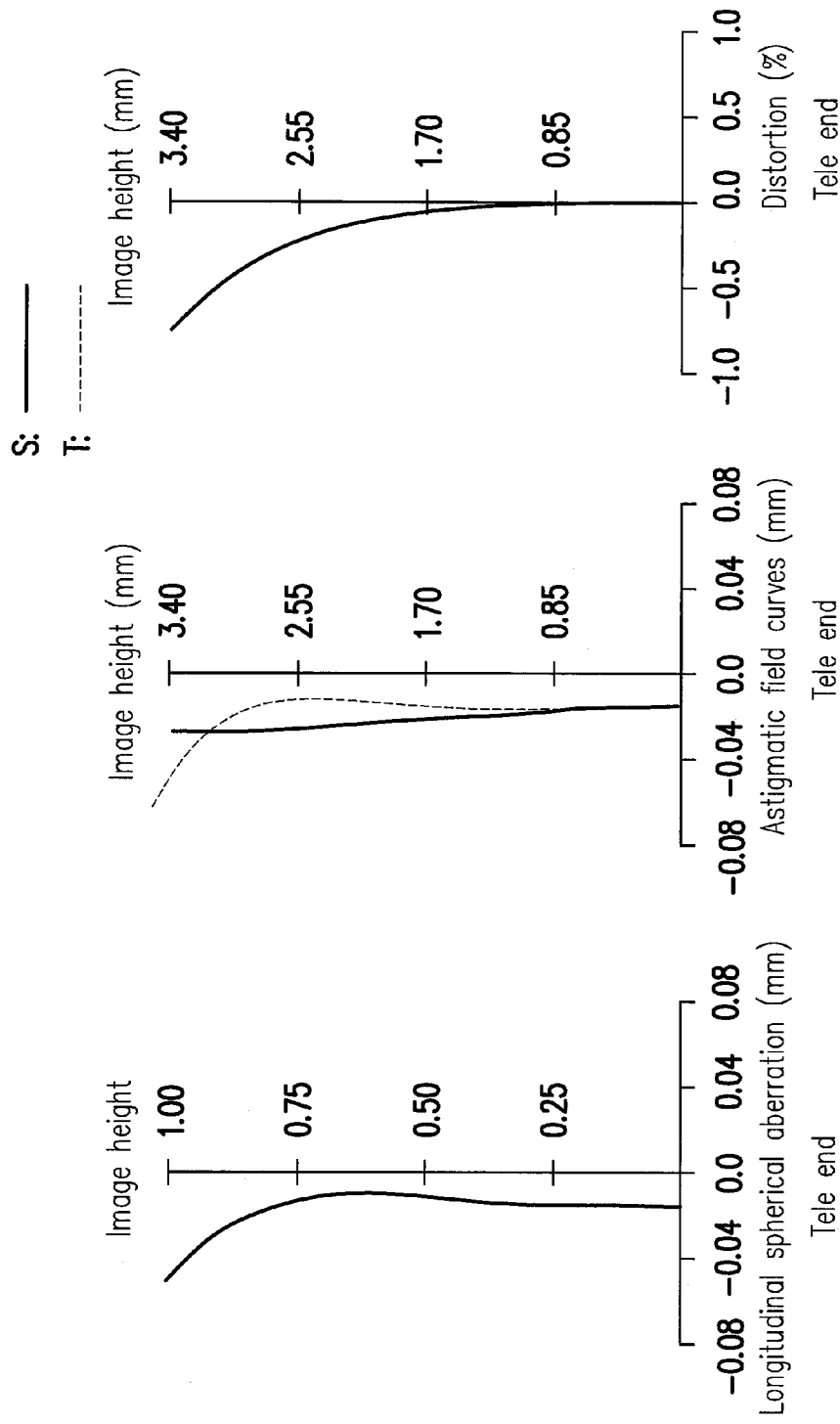

ZOOM LENS

CROSS-REFERENCE TO RELATED APPLICATION

This application claims the priority benefit of Taiwan application serial no. 102115468, filed on Apr. 30, 2013. The entirety of the above-mentioned patent application is hereby incorporated by reference herein and made a part of this specification.

BACKGROUND

Field of the Invention

The invention relates to a lens. More particularly, the invention relates to a zoom lens.

Description of Related Art

Generally speaking, zoom lenses that are commonly available to the market are large-aperture and wide-angle zoom lenses. However, a wide-angle lens is not capable of clearly recognizing distant images and therefore, when being applied to long-distance security monitoring in locations, such as long corridors, long type shelves in shopping malls and so on, the large-aperture and wide-angle zoom lenses can not satisfy the demands of clearly recognizing distant images.

On the other hand, in a zoom lens, aspheric lenses are used to achieve a wide angle so as to mitigate image aberrations and chromatic aberrations. Aspheric lenses may achieve good effects of aberration correction; however, too much use of aspheric lens would result in dramatically cost rise.

Accordingly, how to achieve good image quality of the zoom lenses and the reduction of production cost has been a major subject of the development in the related field.

For instance, in U.S. Pat. Nos. 7,405,885, 7,061,687, 7,489,452 and 4,348,082 as well as U.S. publication Nos. 2010182677 and 2006034000, zoom lenses are disclosed.

SUMMARY

Accordingly, the invention provides a zoom lens having advantages of the long depth of field, high resolution and large aperture.

Additional aspects and advantages of the invention will be set forth in the description of the techniques disclosed in the invention.

For achieving one, parts, or all of the above advantages or other advantages, an embodiment of the invention provides a zoom lens, including a first lens group and a second lens group. The first lens group has a negative refractive power, and the first lens group includes a first lens, a second lens and a third lens in sequence from an object side to an image side. The second lens group has a positive refractive power and is disposed between the first lens group and the image side. The second lens group includes a fourth lens, a fifth lens, a sixth lens, a seventh lens and an eighth lens in sequence from the object side to the image side, and refractive powers of the fourth lens, the fifth lens, the sixth lens, the seventh lens and the eighth lens are positive, negative, positive, negative and positive, respectively. The zoom lens satisfies $-2.4 < f1/f_w < -1.0$, where f1 is an effective focal length of the first lens group, and $f_w$ is an effective focal length of the zoom lens at a wide end.

In an embodiment of the invention, the zoom lens further includes an aperture stop disposed between the first lens group and the second lens group and having a fixed position relative to the zoom lens. The first lens group and the second lens group are capable of moving relative to the aperture stop, so that the zoom lens is switched between the wide end and a tele end. The second lens group is capable of moving to zoom, and the first lens group is capable of moving to focus.

In an embodiment of the invention, refractive powers of the first lens, the second lens and the third lens are positive, negative and negative, respectively.

In an embodiment of the invention, the first lens, the second lens and the third lens are respectively a concave-convex lens having a concave surface facing the object side, a biconcave lens and a convex-concave lens having a convex surface facing image side.

In an embodiment of the invention, the first lens, the second lens and the third lens are respectively a concave-convex lens having a concave surface facing the object side, a biconcave lens and a biconcave lens.

In an embodiment of the invention, the zoom lens satisfies $-2.4 < f1/fw < -1.9$, where f1 is an effective focal length of the first lens group, and fw is an effective focal length of the zoom lens at the wide end.

In an embodiment of the invention, the zoom lens satisfies $1.3 < |f1/f2| < 1.7$, where f1 is an effective focal length of the first lens group, and f2 is an effective focal length of the second lens group.

In an embodiment of the invention, the zoom lens satisfies $D/TTL_W > 0.65$ and $D/TTL_T > 0.75$, where D is a distance between the aperture stop to an image plane located at the image side, $TTL_W$ is a distance from an intersection point intersected between a surface of the first lens facing to the object side and an optical axis of the zoom lens to the image plane when the zoom lens is switched to the wide end, and $TTL_T$ is a distance from the intersection point intersected between the surface of the first lens facing to the object side and the optical axis of the zoom lens to image plane when the zoom lens is switched to the tele end.

In an embodiment of the invention, the second lens group further includes a ninth lens disposed between the fourth lens and the fifth lens and has a positive refractive power.

In an embodiment of the invention, the ninth lens is a biconvex lens.

In an embodiment of the invention, refractive powers of the first lens, the second lens, the third lens are negative, negative and positive, respectively.

In an embodiment of the invention, the first lens, the second lens and the third lens are respectively a biconcave lens, a biconcave lens and a concave-convex lens having a concave surface facing the image side.

In an embodiment of the invention, the zoom lens further includes a third lens group having a positive refractive power disposed between the object side and the first lens group. The third lens group includes a tenth lens and an eleventh lens in sequence from the object side to the image side, and refractive powers of the tenth lens and the eleventh lens are positive and negative, respectively.

In an embodiment of the invention, each of the tenth lens and the eleventh lens is a spherical lens.

In an embodiment of the invention, the tenth lens and the eleventh lens are respectively a biconvex lens and a convex-concave lens having a convex surface facing the image side.

In an embodiment of the invention, the third lens group has a fixed position relative to the zoom lens.

In an embodiment of the invention, the zoom lens satisfies $-1.4 < f1/f_w < -1.0$, where f1 is an effective focal length of the first lens group, and $f_w$ is an effective focal length of the zoom lens at the wide end.

In an embodiment of the invention, the zoom lens satisfies 0.8<|f1/f2|<1.2, where f1 is an effective focal length of the first lens group, and f2 is an effective focal length of the second lens group.

In an embodiment of the invention, the zoom lens satisfies D/TTL>0.45, where D is a distance from the aperture stop to an image plane of the image side, and TTL is a distance from an intersection point intersected between a surface of the tenth lens facing the object side and an optical axis of the zoom lens to the image plane.

In an embodiment of the invention, each of the first lens, the second lens and the third lens is a spherical lens, and at least one of the fourth lens, the fifth lens, the sixth lens, the seventh lens and the eighth lens is an aspheric lens.

In an embodiment of the invention, the fourth lens is the aspheric lens.

In an embodiment of the invention, the fourth lens, the fifth lens, the sixth lens, the seventh lens and the eighth lens are respectively a biconvex lens, a convex-concave lens having a convex surface facing the object side, a biconvex lens, a convex-concave lens having a convex surface facing the object side and a concave-convex lens having a concave surface facing the image side.

In an embodiment of the invention, the fourth lens, the fifth lens, the sixth lens, the seventh lens and the eighth lens are respectively a concave-convex lens having a concave surface facing the image side, a convex-concave lens having a convex surface facing the object side, a biconvex lens, a biconcave lens and a concave-convex lens having a concave surface facing the image side.

In an embodiment of the invention, the fourth lens, the fifth lens, the sixth lens, the seventh lens and the eighth lens are respectively a concave-convex lens having a concave surface facing the image side, a convex-concave lens having a convex surface facing the object side, a biconvex lens, a convex-concave lens having a convex surface facing the object side and a concave-convex lens having a concave surface facing the image side.

In an embodiment of the invention, an Abbe Number of at least one of the first lens, the second lens and the third lens is greater than 70.

In an embodiment of the invention, at least two adjacent lenses of the second lens group forms a double cemented lens, and an Abbe number of at least one of the at least two adjacent lenses is greater than 70.

To sum up, in the zoom lens provided by the embodiments of the invention, by using the first lens group and the second lens group together which respectively have a negative and a positive refractive powers and the collocation of the first lens group and the second lens group, image aberration and chromatic aberration may be mitigated. Accordingly, the zoom lens provided by the embodiments of the invention has a better imaging quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A through FIG. 2D are respectively graphs showing simulated optical data of the zoom lens of FIG. 1A when the zoom lens is at the wide end.

FIG. 2E through FIG. 2H are respectively graphs showing simulated optical data of the zoom lens of FIG. 1B when the zoom lens is at the tele end.

FIG. 3A through FIG. 3B are respectively schematic diagrams illustrating a zoom lens at a wide end and at a tele end according to another embodiment of the invention.

FIG. 4A through FIG. 4D are respectively graphs showing simulated optical data of the zoom lens of FIG. 3A when the zoom lens is at the wide end.

FIG. 4E through FIG. 4H are respectively graphs showing simulated optical data of the zoom lens of FIG. 3B when the zoom lens is at the tele end.

FIG. 6E through FIG. 6H are respectively graphs showing simulated optical data of the zoom lens of FIG. 5B when the zoom lens is at the tele end.

FIG. 8E through FIG. 8H are respectively graphs showing simulated optical data of the zoom lens of FIG. 7B when the zoom lens is at the tele end.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
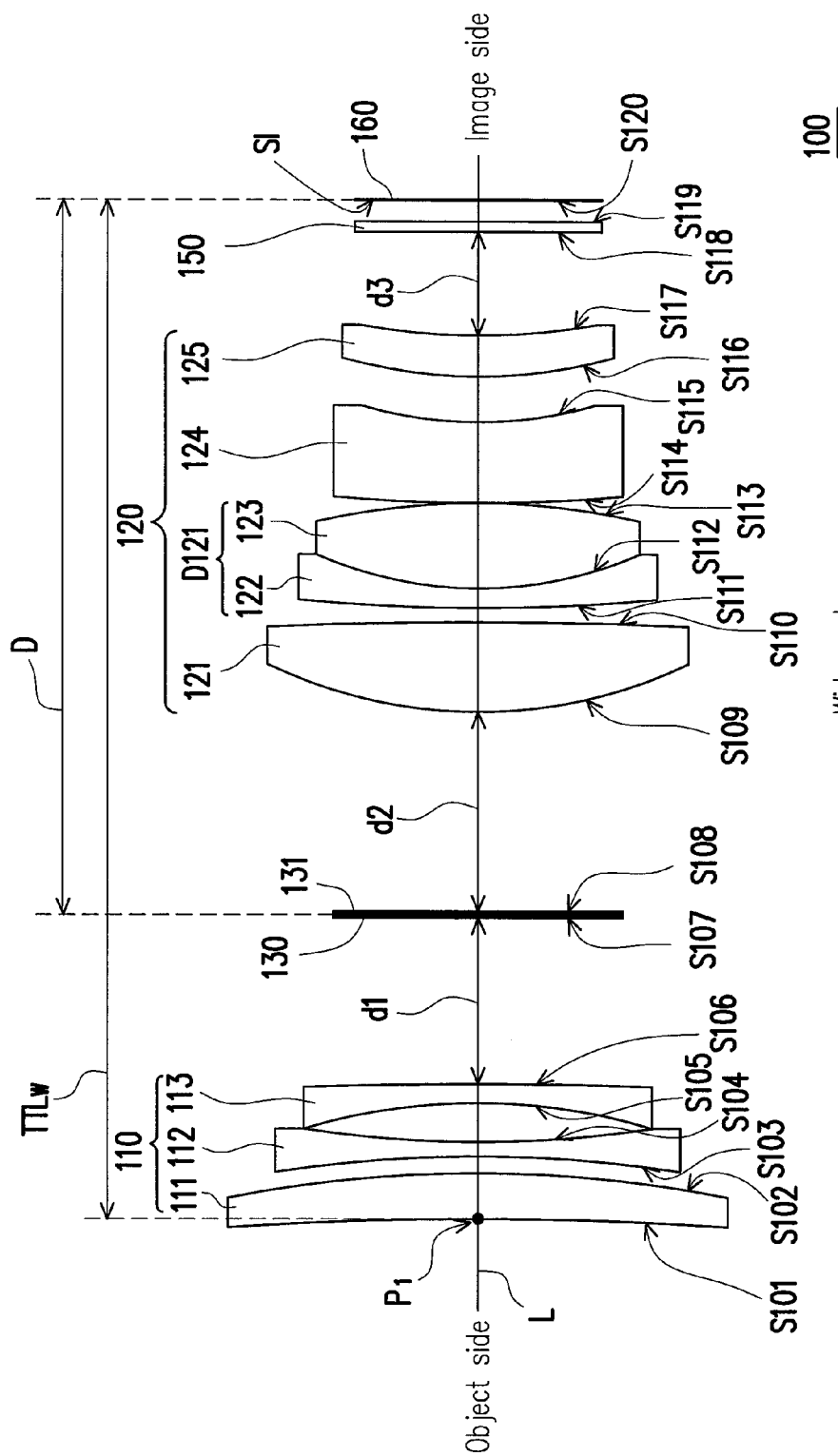
FIG. 1A through FIG. 1B are respectively schematic diagrams illustrating a zoom lens at a wide end and at a tele end according to an embodiment of the invention.
Figure 1B:
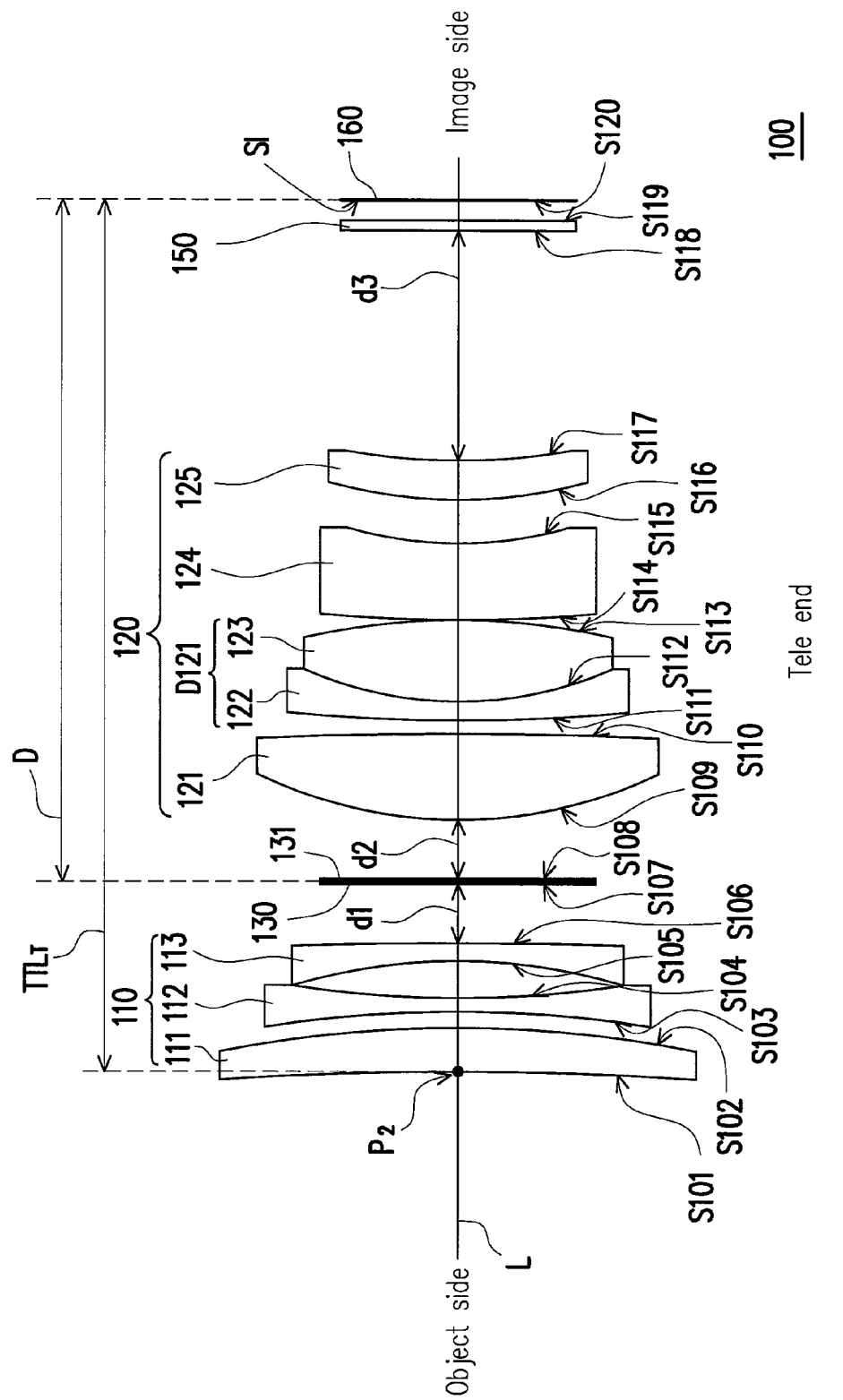
Figure 2D:
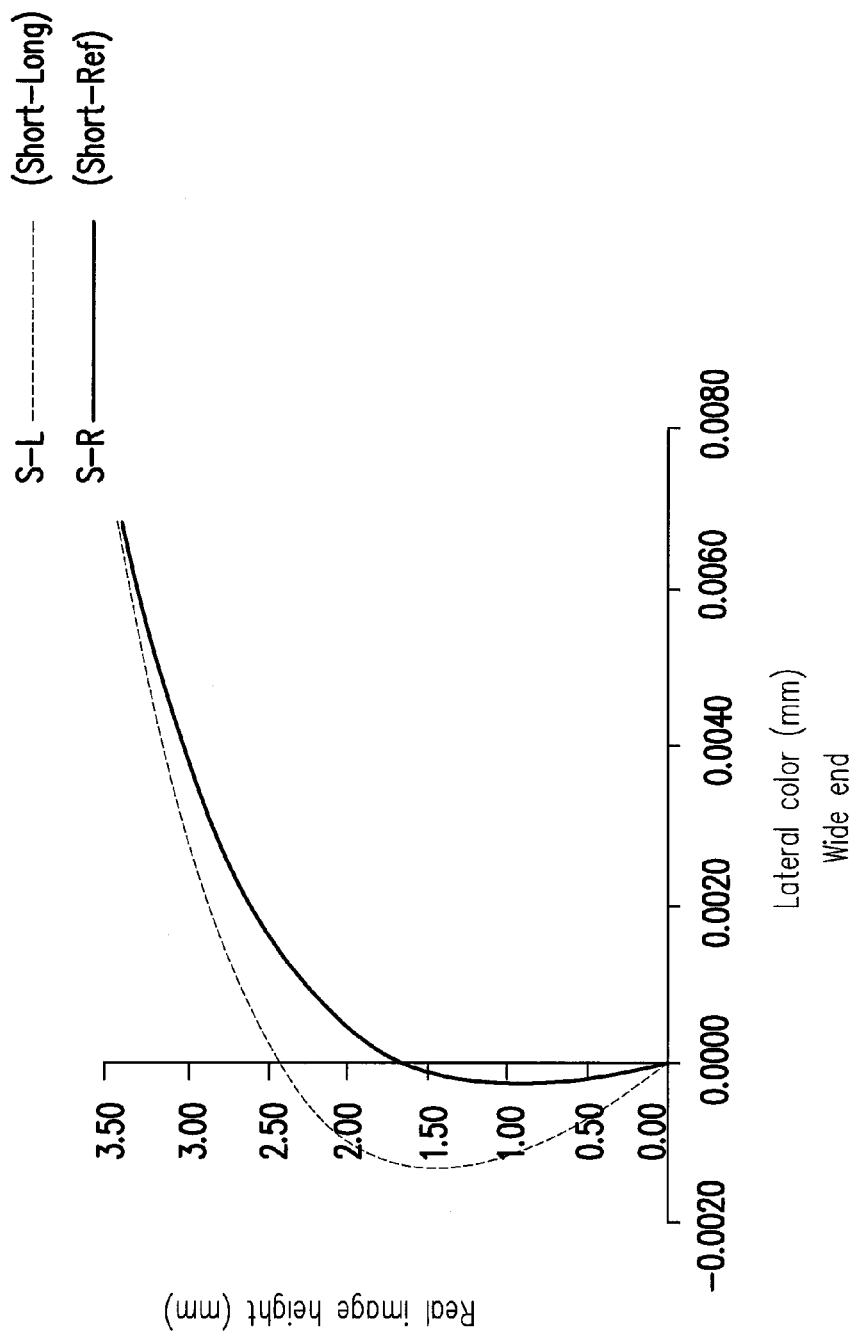
Figure 2H:
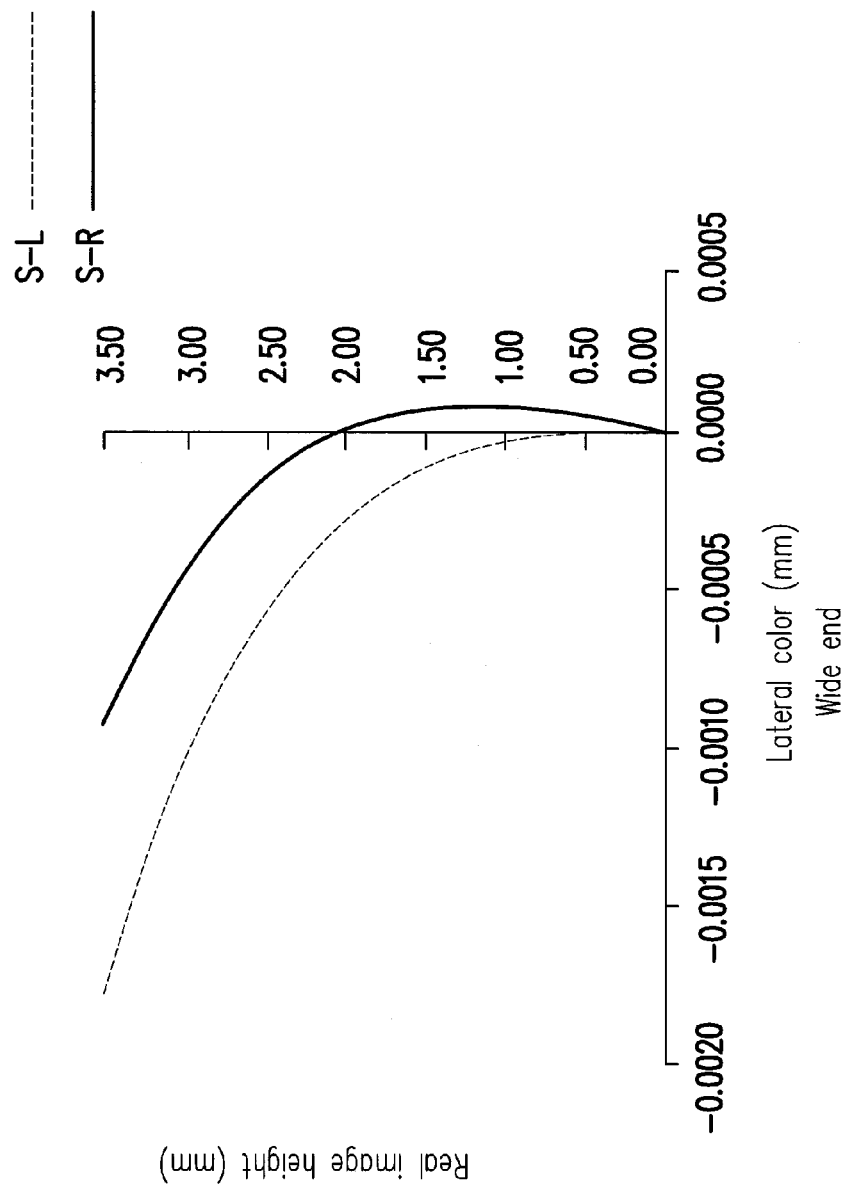

FIG. 1A through FIG. 1B are respectively schematic diagrams illustrating a zoom lens at a wide end and at a tele end according to an embodiment of the invention. With reference to FIG. 1A through FIG. 1B, in the embodiment, a zoom lens 100 includes a first lens group 110 and a second lens group 120. The first lens group 110 has a negative refractive power, and the second lens group 120 has a positive refractive power. The first lens group 110 includes a first lens 111, a second lens 112 and a third lens 113 in sequence from an object side to an image side, and refractive powers of the first lens 111, the second lens 112 and the third lens 113 are positive, negative and negative, respectively. The second lens group 120 is disposed between the first lens group 110 and the image side. The second lens group 120 includes a fourth lens 121, a fifth lens 122, a sixth lens 123, a seventh lens 124 and an eighth lens 125 in sequence from an object side to an image side, and refractive powers of the fourth lens 121, the fifth lens 122, the sixth lens 123, the seventh lens 124 and the eighth lens 125 are positive, negative, positive, negative and positive, respectively.

Additionally, with reference to FIG. 1A through FIG. 1B, in the embodiment, the zoom lens 100 further includes a filter 130, and an aperture stop 131 is on a surface (e.g. the surface S108) of the filter 130. The aperture stop 131 is disposed between the first lens group 110 and the second lens group 120 and having a fixed position relative to the zoom lens 100. The first lens group 110 and the second lens group 120 are capable of moving relative to the aperture stop 131, so that the zoom lens 100 is switched between a wide end and a tele end. To be more specific, in the embodiment, the second lens group 120 has a zoom function and is capable of moving to zoom, and the first lens group 110 has a focus function and is capable of moving to focus.

In detail, when the first lens group 110 and the second lens group 120 are moved toward a direction closer to each other, the zoom lens 100 is switched from the wide end toward the tele end. In the mean time, variable intervals d1 and d2 of the zoom lens 100 become smaller, while a variable interval d3 becomes larger, and a focal length of the zoom lens 100 is changed from the wide end (as shown in FIG. 1A) to the tele end (as shown in FIG. 1B). Otherwise, when the first lens group 110 and the second lens group 120 are moved toward a direction away from each other, the zoom lens 100 is switched from the tele end to the wide end. In the mean time, the variable intervals d1 and d2 of the zoom lens 100 become larger, while the variable interval d3 becomes smaller, and the focal length of the zoom lens 100 is also changed from the tele end (as shown in FIG. 1B) to the wide end (as shown in FIG. 1A). During a zoom process, the position of the aperture stop 131 keeps fixed relative to the zoom lens 100.

In particular, in the embodiment, the zoom lens 100 satisfies $-2.4<f1/f_w<-1.0$, where f1 is an effective focal length of the first lens group 110, and fw is an effective focal length of the zoom lens 100 at the wide end. Moreover, when the zoom lens 100 does not satisfy $-2.4<f1/f_w<-1.0$, disadvantages as follows will occur. In case f1/fw<-2.4, the overall size of the first lens group 110 becomes larger and can not be miniaturized, while in case f1/fw>-1, the refractive power of the first lens group 110 becomes greater, which leads to increase in manufacturing cost and reduction of the functionality of the lens. To more specific, in the embodiment, zoom lens 100 further satisfies $-2.4<f1/f_w<-1.9$ and $1.3<|f1/f2|<1.7$, where f2 is an effective focal length of the second lens group 120.

On the other hand, with reference to FIG. 1A, when the zoom lens 100 of the embodiment is switched to the wide end, the zoom lens 100 satisfies $D/TTL_W>0.65$, where D is a distance from the aperture stop 131 to an image plane SI of the image side, $TTL_W$ is a distance from an intersection point $P_1$ intersected between a surface S101 of the first lens 111 facing the object side and an optical axis L of the zoom lens 100 to the image plane SI. Additionally, with reference to FIG. 1B, when the zoom lens 100 of the embodiment is switched to the tele end, the zoom lens 100 satisfies $D/TTL_T>0.75$, where $TTL_T$ is a distance from an intersection point $P_2$ intersected between the surface S101 of the first lens 111 facing the object side and the optical axis L of the zoom lens 100 to the image plane SI. By doing so, the thickness of the zoom lens 100 may be limited so as to reduce the volume of the zoom lens 100.

Hereinafter, a structure and a material of each lens of the zoom lens 100 will be further described.

In the zoom lens 100, each of the first lens 111, the second lens 112 and the third lens 113 is, for example, a spherical lens. At least one of the fourth lens 121, the fifth lens 122, the sixth lens 123, the seventh lens 124 and the eighth lens 125 is an aspheric lens. In the embodiment, the fourth lens 121 is an aspheric lens, but the invention is not limited thereto. To be more specific, in the embodiment, the first lens 111 is, for example, a concave-convex lens having a concave surface (e.g. the surface S101) facing the object side, the second lens 112 is, for example, a biconcave lens, the third lens 113 is, for example, a convex-concave lens having a convex surface (e.g. a surface S106) facing the image side. In addition, the fourth lens 121 is, for example, a biconvex lens, the fifth lens 122 is, for example, a convex-concave lens having a convex surface (e.g. a surface S111) facing the object side, the sixth lens 123 is, for example, a biconvex lens, the seventh lens 124 is, for example, a convex-concave lens having a convex surface (e.g. a surface S114) facing the object side, and the eighth lens 125 is, for example, a concave-convex lens having a concave surface (e.g. a surface S117) facing the image side.

In the embodiment, a material of the first lens 111 through the eighth lens 125 is, for example, glass or plastic. However, a general lens may cause chromatic dispersion for different wavelengths, so that a visible light and infrared light may not be focused on the same plane, which may lead to a chromatic aberration phenomenon. To resolve the chromatic aberration problem, in the embodiment, an Abbe number of at least one of the first lens 111, the second lens 112 and the third lens 113 is greater than 70. In particular, in the embodiment, the third lens 113 has an Abbe number that is greater than 70, but the invention is not limited thereto. For instance, in the embodiment, a material used by the third lens 113 is, for example, a low dispersion glass material.

Moreover, in the embodiment, at least two adjacent lenses of the second lens group 120 forms a first double cemented lens D121, and at least one of the at least two adjacent lenses has an Abbe number greater than 70. To be more specific, in the embodiment, the fifth lens 122 and the sixth lens 123 forms the first double cemented lens D121, a surface of the fifth lens 122 facing the image side and a surface of the sixth lens 123 facing the object side has the same radius of curvature (i.e. a surface S112), and at least one of the fifth lens 122 and the sixth lens 123 has an Abbe number greater than 70. To be detailed, in the embodiment, the sixth lens 123 has an Abbe number greater than 70, but the invention is not limited thereto. In the embodiment, a material used by the sixth lens 123 is, for example, a low dispersion glass material.

Accordingly, when lights with different wavelengths pass through the third lens 113 and the sixth lens 123, a chromatic dispersion degree thereof is relatively small. Therefore, when the zoom lens 100 is used for imaging under visible light and infrared light, imaging positions of different wavelengths are focused to a same plane, so as to effectively eliminate a chromatic aberration phenomenon. As a result, when the zoom lens 100 has a better infrared light correction effect, a better imaging quality could be provided, and thus, no matter whether the zoom lens is used in either daytime or nighttime, both good infrared light correction effect and imaging quality could be achieved.

In the zoom lens 100 of the embodiment, by using a combination of seven spherical lenses and an aspheric lens together with the first lens group 110 and the second lens group 120 respectively having the negative and positive refractive powers and the collocation of the first lens group 110 and the second lens group 120, image aberration and chromatic aberration may be mitigated. Moreover, during the zoom process, the position of the aperture stop 131 keeps fixed, so that a linking-up mechanism of the zoom lens 100 is relatively simple, and accordingly, not only is a cost of the zoom lens 100 reduced, but also the zoom lens 100 may have a small volume. Further, in the embodiment, a few of aspheric lenses and low dispersion glasses are used by the zoom lens 100 with no extra low dispersion glass (ED glass), the cost spent on lenses could be saved so as to improve the production yield of the zoom lens. Meanwhile, the zoom lens 100 of the embodiment may have a high resolution of two megapixels and thus, have a better image quality.

An embodiment of the zoom lens 100 is provided below, though data provided below is not used for limiting the invention, and those skilled in the art may suitably modify parameters or settings of the following embodiment with reference of the invention without departing from the scope or spirit of the invention.

TABLE 1

| Surface | Radius of Curvature (mm) | Interval (mm) | Refractive Index | Abbe Number | Remarks |
|---|---|---|---|---|---|
| Object Side | Infinity | Infinity | | | |
| S101 | −82.49 | 2.18 | 1.85 | 23.8 | First lens |
| S102 | −23.77 | 0.79 | | | |
| S103 | −26.49 | 0.80 | 1.52 | 64.1 | Second lens |
| S104 | 23.84 | 1.85 | | | |
| S105 | −10.86 | 0.80 | 1.50 | 81.6 | Third lens |
| S106 | −103.87 | Variable Interval (d1) | | | |
| S107 | Infinity | 0.15 | 1.52 | 64.2 | Filter |
| S108 | Infinity | Variable Interval (d2) | | | Aperture stop |
| S109 | 9.22 | 3.98 | 1.58 | 59.0 | Fourth lens |
| S110 | −47.82 | 0.94 | | | |
| S111 | 37.11 | 0.80 | 1.69 | 31.1 | Fifth lens |
| S112 | 7.02 | 4.09 | 1.50 | 81.5 | Sixth lens |
| S113 | −12.62 | 0.10 | | | |
| S114 | 28.21 | 3.77 | 1.67 | 32.1 | Seventh lens |
| S115 | 7.36 | 2.13 | | | |
| S116 | 8.40 | 1.97 | 1.92 | 20.9 | Eighth lens |
| S117 | 11.64 | Variable Interval (d3) | | | |
| S118 | Infinity | 0.45 | 1.52 | 64.2 | Cover glass |
| S119 | Infinity | 1.00 | | | |
| S120 | Infinity | 0.00 | | | Image sensing device |

In Table 1, a radius of curvature represents a radius curvature of each surface, and an interval represents a distance between two adjacent surfaces. For example, an interval of the surface S101 represents a distance on an optical axis L from the surface S101 to the surface S102. The thickness, the refractive index, and the Abbe number of each lens in the remark column correspond to values of each interval, the refractive index, and the Abbe number in the same row. Moreover, the surfaces S101 and S102 are two surfaces of the first lens 111, the surfaces S103 and S104 are two surfaces of the second lens 112, and surfaces S105 and 106 are two surfaces of the third lens 113. The surfaces S107 and S108 are two surfaces of the filter 130, and the surface S108 is the aperture stop 131. The filter 130 may be an IR cut filter. The surfaces S109 and S110 are two surfaces of the fourth lens 121, the surface S111 is a surface of the fifth lens 122 facing the object side, the surface S112 is a surface of the fifth lens 122 contacting the sixth lens 123, the surface S113 is a surface of the sixth lens 123 facing the image side, the surfaces S114 and S115 are two surfaces of the seventh lens 124, and the surface S116 and S117 are two surfaces of the eighth lens 125. The surfaces S118 and S119 are two surfaces of the cover glass 150. In the embodiment, when the zoom lens 100 is used for imaging, the image sensing device 160 may be disposed at the image side, the cover glass 150 is used to protect the image sensing device 160, and the surface 5120 is the image plane SI of the image sensing device 160. Additionally, in the embodiment, the image sensing device 160 is, for example, a charge coupled device (CCD) or a complementary metal oxide semiconductor (CMOS) image sensing device.

Accordingly, the surfaces S109 and S110 are aspheric surfaces, and an formula of the aspheric surface is as follows:

$$Z = \frac{(1/R)H^2}{1 + \sqrt{1 - (1+K)(H/R)^2}} + AH^4 + BH^6 + CH^8 + DH^{10} + EH^{12}$$

where Z is a sag along the optical axis L, and R is the radius of an osculating sphere, i.e., the radius of curvature close to the optical axis L (e.g. the radius of curvatures of S109 and S110 listed in Table 1). K is a conic constant and H is an aspheric height, i.e., the height from the center to the edge of the lens. It may be known from the formula that different H values are corresponding to different Z values. A, B, C, and D are aspheric coefficients. The aspheric coefficients and the K values of the surfaces S109 and S110 are shown in Table 2:

TABLE 2

| Surface | K | A | B | C | D | E |
|---------|---|---|---|---|---|---|
| S109 | 0 | −7.641E−05 | 1.609E−06 | 1.630E−08 | −9.744E−10 | 3.051E−11 |
| S110 | 0 | 3.223E−04 | 1.629E−06 | 9.083E−08 | −3.296E−09 | 7.794E−11 |

In Table 3, values of the zoom lens 100 when the focal length thereof corresponds to the wide end and the tele end are listed, and the values of the zoom lens 100 include effective focal length (EFL), field of view (FOV), F-number, and variable intervals d1, d2, and d3.

TABLE 3

|  |  | Wide end | Tele end |
|---|---|---|---|
| Effective focal length (mm) |  | 8 | 22 |
| F-number |  | 1.6 | 3 |
| Field of View (degree) |  | 49 | 18.6 |
| Variable interval (mm) | d1 | 8.06 | 1.61 |
|  | d2 | 9.62 | 1.30 |
|  | d3 | 4.95 | 13.26 |

Referring to Table 3, since the F-number of the zoom lens 100 of the embodiment may be as small as 1.6, the zoom lens 100 has the advantage of the large aperture. Moreover, since the effective focal length of the zoom lens 100 may reach 8-22 mm, the zoom lens 100 has the advantage of the long depth of field.

FIG. 2A through FIG. 2D are respectively graphs showing simulated optical data of the zoom lens of FIG. 1A when the zoom lens is at the wide end. FIG. 2E through FIG. 2H are respectively graphs showing simulated optical data of the zoom lens of FIG. 1B when the zoom lens is at the tele end. Moreover, FIG. 2A through FIG. 2H are graphs showing the simulated optical data performed by using light having a wavelength of 587 nm. Referring to the longitudinal spherical aberration graphs shown in FIG. 2A and FIG. 2E, the longitudinal axis shows image heights, where a position having the image height of 1 represents a position of the maximum field. Additionally, referring to the astigmatic field curve graphs shown in FIG. 2B and FIG. 2F, S represents data in a sagittal direction, while T represents data in a tangential direction. Referring to the lateral color graphs shown in FIG. 2D and FIG. 2H, a short-long (S-L) line represents a difference between a short wavelength of 486 nm and a long wavelength of 656 nm, while a short-ref (S-R) line represents a difference between the short wavelength of 486 nm and a reference wavelength of 587 nm. Referring to FIG. 2A through 2H, the zoom lens 100 could have good imaging quality in all of the aspects of longitudinal spherical aberration, distortion, astigmatic field curves and lateral color when the focal length thereof is at both of the tele end and the wide end. Accordingly, the zoom lens 100 of the embodiment could achieve the advantages of having small volume and low cost under the premise of the good imaging quality being maintained.

Figure 3A:
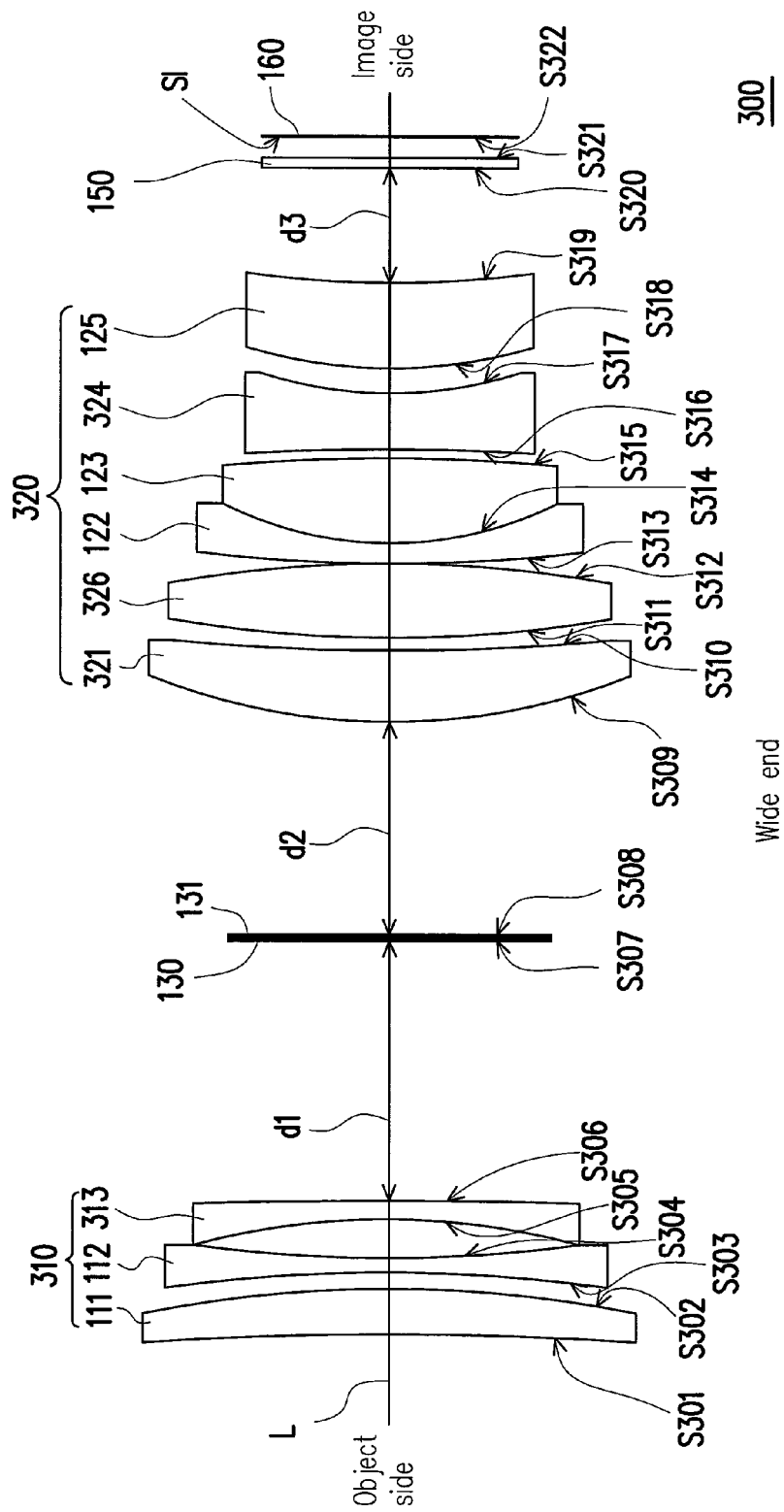
Figure 4D:
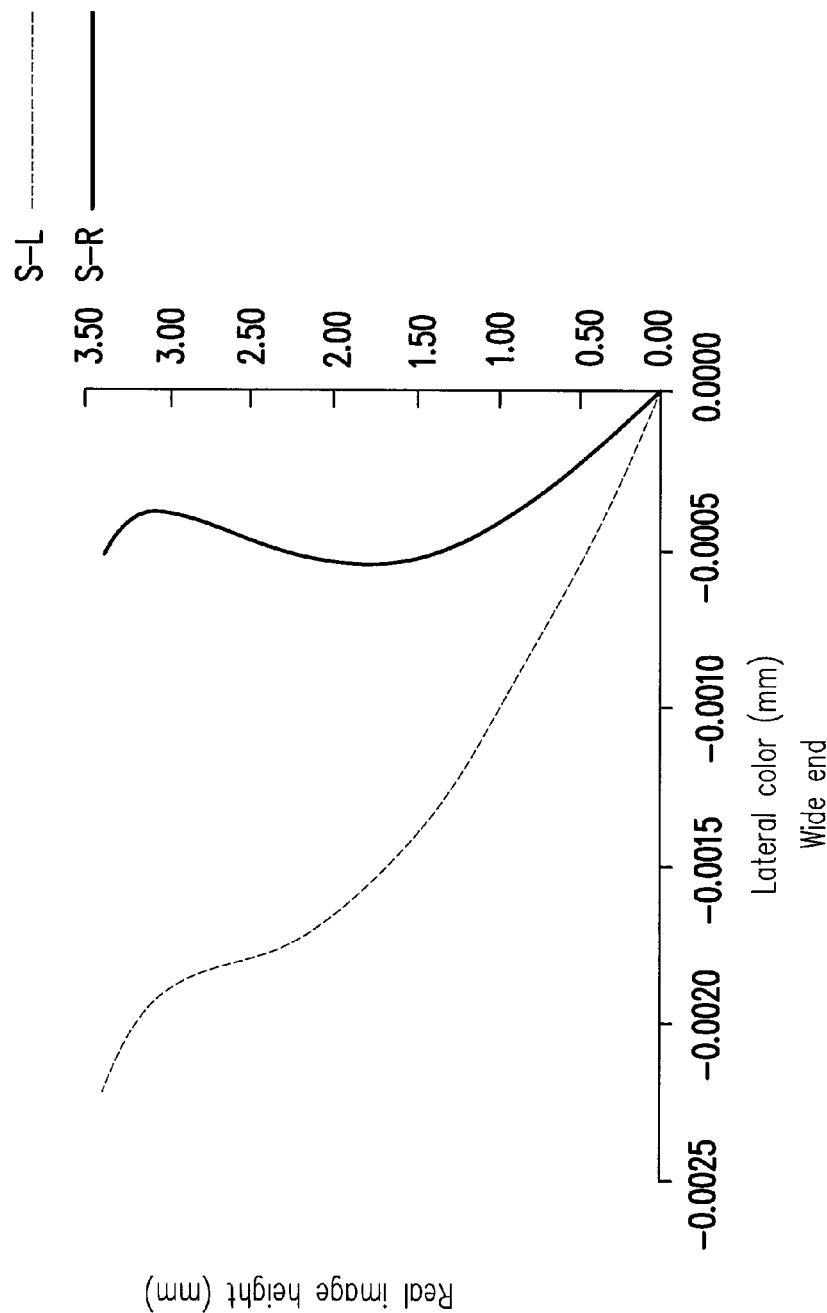

FIG. 3A through FIG. 3B are respectively schematic diagrams illustrating a zoom lens at a wide end and at a tele end according to another embodiment of the invention. With reference to FIG. 3A through FIG. 3B, a zoom lens 300 of the embodiment is similar to the zoom lens 100 illustrated in FIG. 1A through FIG. 1B, and the difference therebetween is described as follows. In the zoom lens 300 of the embodiment, a third lens 313 of a first lens group 310 is a biconcave lens, a fourth lens 321 of a second lens group 320 is a concave-convex lens having a concave surface (S310) facing the image side and a seventh lens 324 of the second lens group 320 is a biconcave lens. Additionally, in the embodiment, the fourth lens 321 is an aspheric lens, and the third lens 313 and the seventh lens 324 are spherical lenses. Moreover, in the embodiment, both the second lens 112 and the third lens 113 have Abbe numbers greater than 70, but the invention is not limited thereto.

Furthermore, the second lens group 320 of the embodiment further includes a ninth lens 326 disposed between the fourth lens 321 and the fifth lens 122. The ninth lens 326 has a positive refractive power and is a spherical lens. For instance, in the embodiment, the ninth lens 326 may be a biconvex lens, but the invention is not limited thereto.

In addition, in the embodiment, the operation mechanism of the first lens group 310 and the second lens group 320 is similar to that of the first lens group 110 and the second lens group 120 of the embodiment illustrated in FIG. 1, and thus, related details thereof may be referred to in the above description, which will not be repeatedly hereinafter. Besides, structures of the zoom lens 300 of the embodiment and the zoom lens 100 are similar, so that the zoom lens 300 also has the advantages that the zoom lens 100 has, and detailed description thereof is not repeated.

An embodiment of the zoom lens 300 is provided below, though data provided below is not used for limiting the invention, and those skilled in the art may suitably modify parameters or settings of the following embodiment with reference of the invention without departing from the scope or spirit of the invention.

TABLE 4

| Surface | Radius of curvature (mm) | Interval (mm) | Refractive Index | Abbe number | Remarks |
|---------|---|---|---|---|---|
| Object side | Infinity | Infinity |  |  |  |
| S301 | −48.20 | 1.98 | 1.73 | 28.5 | First lens |
| S302 | −19.05 | 0.48 |  |  |  |
| S303 | −19.09 | 0.80 | 1.50 | 81.5 | Second lens |
| S304 | 46.28 | 1.41 |  |  |  |
| S305 | −12.68 | 0.80 | 1.44 | 94.9 | Third lens |
| S306 | 144.96 | Variable interval (d1) |  |  |  |
| S307 | Infinity | 0.15 | 1.52 | 64.2 | Filter |
| S308 | Infinity | Variable interval (d2) |  |  | Aperture stop |
| S309 | 10.47 | 2.94 | 1.69 | 52.7 | Fourth lens |
| S310 | 96.71 | 0.45 |  |  |  |
| S311 | 19.77 | 3.01 | 1.44 | 94.9 | Ninth lens |
| S312 | −19.77 | 0.10 |  |  |  |
| S313 | 29.65 | 0.77 | 1.70 | 30.1 | Fifth lens |
| S314 | 6.25 | 3.34 | 1.50 | 81.5 | Sixth lens |
| S315 | −26.17 | 0.23 |  |  |  |
| S316 | −302.13 | 2.28 | 1.72 | 29.5 | Seventh lens |
| S317 | 6.35 | 1.18 |  |  |  |
| S318 | 8.04 | 3.42 | 1.92 | 20.9 | Eighth lens |
| S319 | 19.08 | Variable interval (d3) |  |  |  |
| S320 | Infinity | 0.45 | 1.52 | 64.2 | Cover glass |
| S321 | Infinity | 1.00 |  |  |  |
| S322 | Infinity | 0.00 |  |  | Image sensing device |

In Table 4, the radius of curvature represents a radius curvature of each surface, and the interval represents a distance between two adjacent surfaces. For example, an interval of the surface S301 represents a distance between the surface S301 and the surface S302. The thickness, the refractive index, and the Abbe number of each lens in the remark column correspond to values of the refractive index and the Abbe number in the same row. Moreover, the surfaces S301 and S302 are two surfaces of the first lens 111, the surfaces S303 and 5304 are two surfaces of the second lens 112, and the surfaces S305 and S306 are two surfaces of the third lens 313. The surfaces S307 and S308 are two surfaces of the filter 130, and the surface S308 is a surface of the aperture stop 131. The surfaces S309 and S310 are two surfaces of the fourth lens 321, the surfaces S311 and S312 are two surfaces of the ninth lens 326, the surface S313 is a surface of the fifth lens 122 facing the object side, the surface S314 is a surface of the fifth lens 122 contacting the sixth lens 123, the surface S315 is a surface of the sixth lens 123 facing the image side, the surfaces S316 and S317 are two surfaces of the seventh lens 324, and the surfaces S318 and S319 are two surfaces of the eighth lens 125. The surfaces S320 and S321 are two surfaces of the cover glass 150. In the embodiment, when the zoom lens 300 used for imaging, an image sensing device 160 may be disposed at the image side. The cover glass 150 is used to protect the image sensing device 160, and the surface S321 is the image plane SI of the image sensing device 160. Moreover, in the embodiment, the image sensing device 160 is, for example, a CCD or a CMOS image sensing device.

Accordingly, the surfaces S309 and S310 are aspheric surfaces, and a formula applied thereto is the same as the formula applied to Table 1 in the above, where the physical meaning of each parameter may be referred to the description with respect to Table 1 and will not be repeated hereinafter. Aspheric coefficients and each parameter of the surfaces S309 and S310 are shown in Table 5 as follows:

TABLE 5

| Surface | K | A | B | C | D |
|---|---|---|---|---|---|
| S309 | 0 | −4.538E−05 | −4.022E−07 | 7.322E−09 | 5.571E−10 |
| S310 | 0 | 2.025E−04 | −2.580E−07 | 2.836E−08 | 7.326E−10 |

In Table 6, values of the zoom lens 300 when the focal length thereof corresponds to the wide end and the tele end include EFL, FOV, F-number, and variable intervals d1, d2, and d3.

TABLE 6

| | | Wide end | Tele end |
|---|---|---|---|
| Effective focal length (mm) | | 8 | 22 |
| F-number | | 1.6 | 2.9 |
| Field of View (degree) | | 49 | 18.3 |
| Variable interval (mm) | d1 | 10.38 | 2.01 |
| | d2 | 8.50 | 0.93 |
| | d3 | 4.34 | 11.92 |

Referring to Table 6, since the F-number of the zoom lens 300 of the embodiment may be as small as 1.6, the zoom lens 300 has the advantage of the large aperture. Moreover, since the effective focal length of the zoom lens 300 may reach 8-22 mm, the zoom lens 300 has the advantage of the long depth of field.

FIG. 4A through FIG. 4D are respectively graphs showing simulated optical data of the zoom lens of FIG. 3A when the zoom lens is at the wide end. FIG. 4E through FIG. 4H are respectively graphs showing simulated optical data of the zoom lens of FIG. 3B when the zoom lens is at the tele end. Moreover, FIG. 4A through FIG. 4H are graphs showing the simulated optical data performed by using light having a wavelength of 587 nm. Referring to the longitudinal spherical aberration graphs shown in FIG. 4A and FIG. 4E, the longitudinal axis shows image heights, where a position having the image height of 1 represents a position of the maximum field. Additionally, referring to the astigmatic field curve graphs shown in FIG. 4B through FIG. 4F, S represents data in a sagittal direction, while T represents data in a tangential direction. Referring to the lateral color graphs shown in FIG. 4D and FIG. 4H, the short-long (S-L) line represents a difference between a short wavelength of 486 nm and a long wavelength of 656 nm, while the short-ref (S-R) line represents a difference between the short wavelength of 486 nm and a reference wavelength of 587 nm. Referring to FIG. 4A through 4H, the zoom lens 300 could have good imaging quality in all of the aspects of longitudinal spherical aberration, distortion, astigmatic field curves and lateral color when the focal length thereof is at both of the tele end and the wide end. Accordingly, the zoom lens 300 of the embodiment could achieve the advantages of having small volume and low cost under the premise of the good imaging quality being maintained.

Figure 5A:
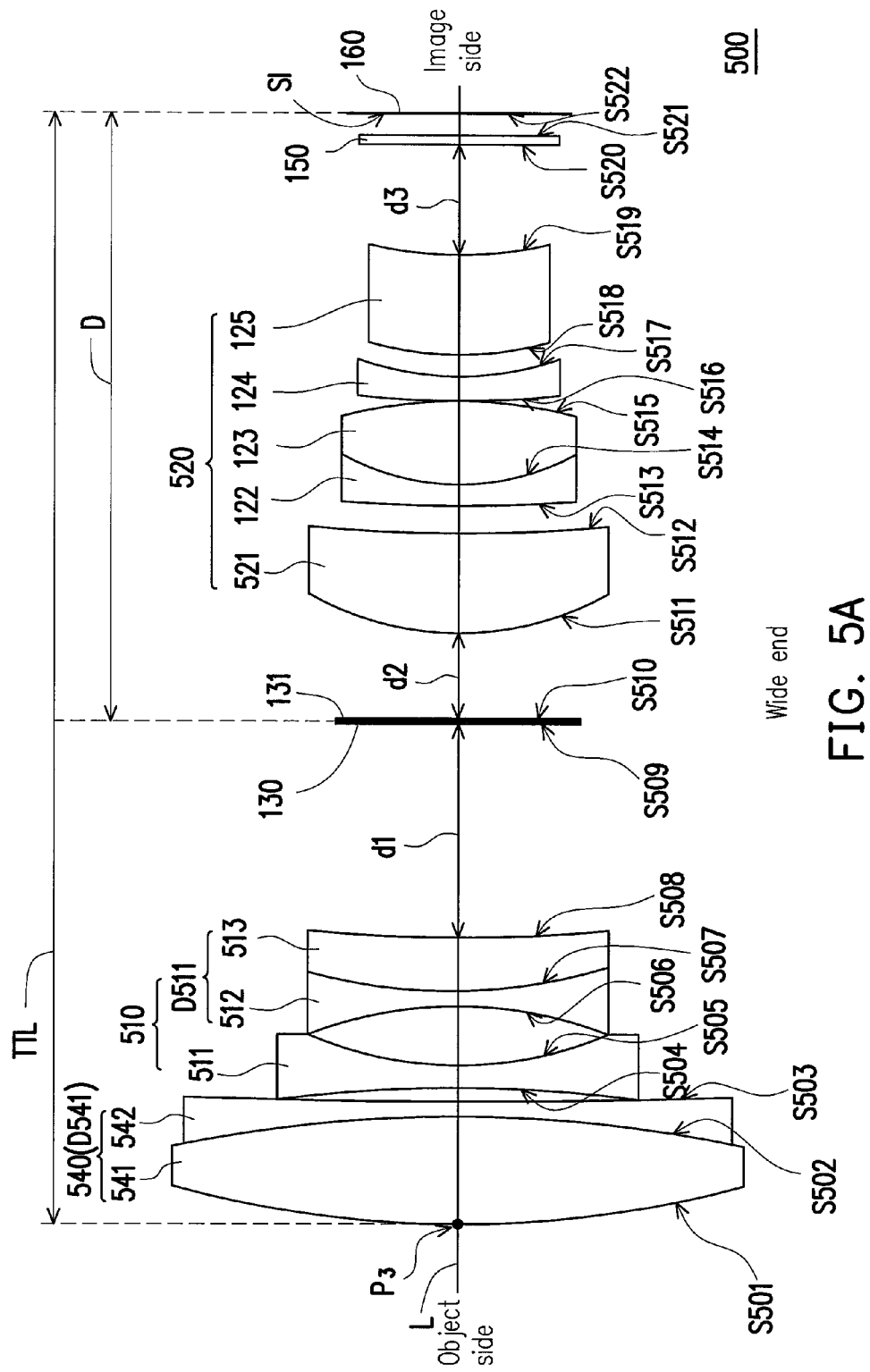
FIG. 5A through FIG. 5B are respectively schematic diagrams illustrating a zoom lens at a wide end and at a tele end according to yet another embodiment of the invention.
Figure 5B:
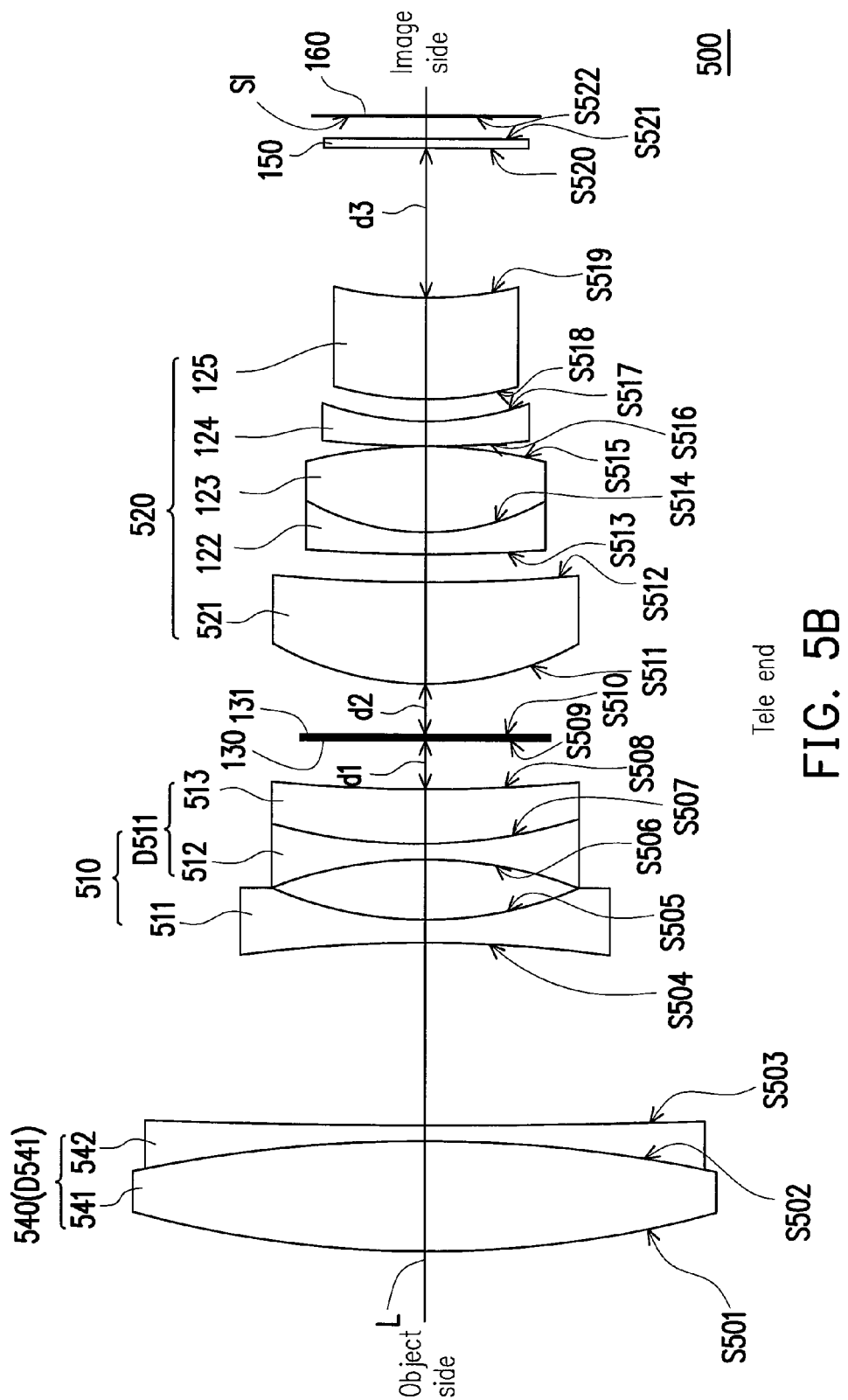
Figures 6A, 6B, 6C:
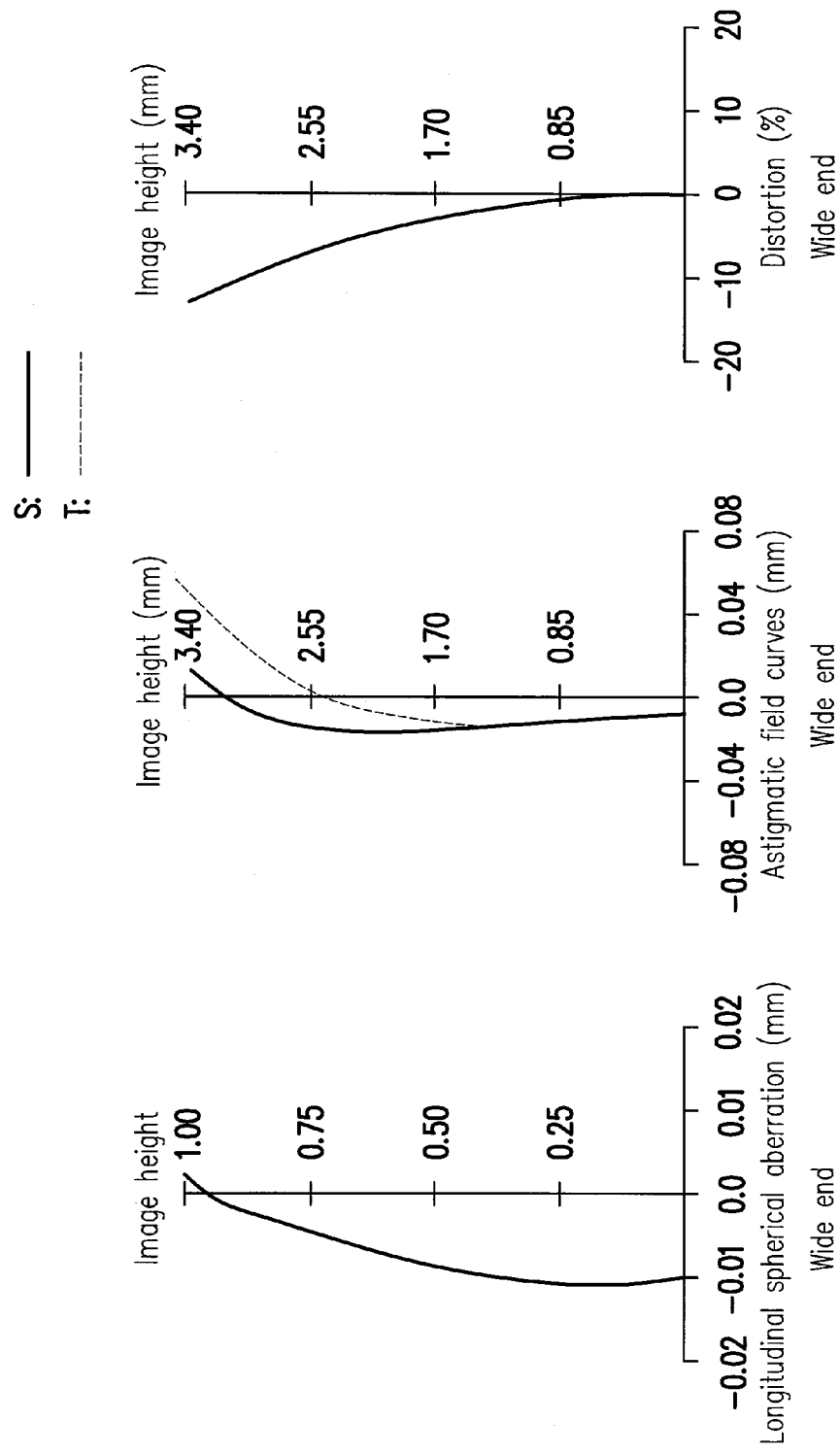
FIG. 6A through FIG. 6D are respectively graphs showing simulated optical data of the zoom lens of FIG. 5A when the zoom lens is at the wide end.
Figure 6D:
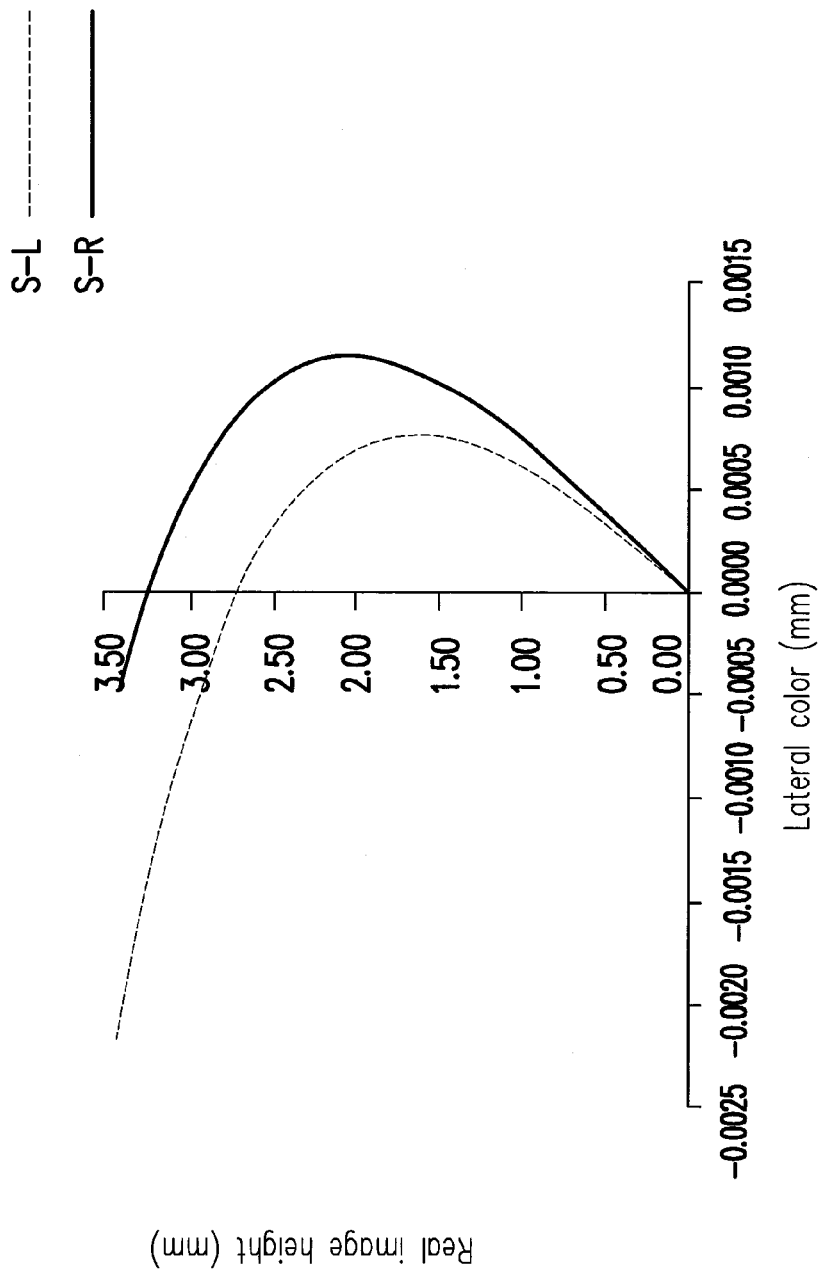
Figure 6H:
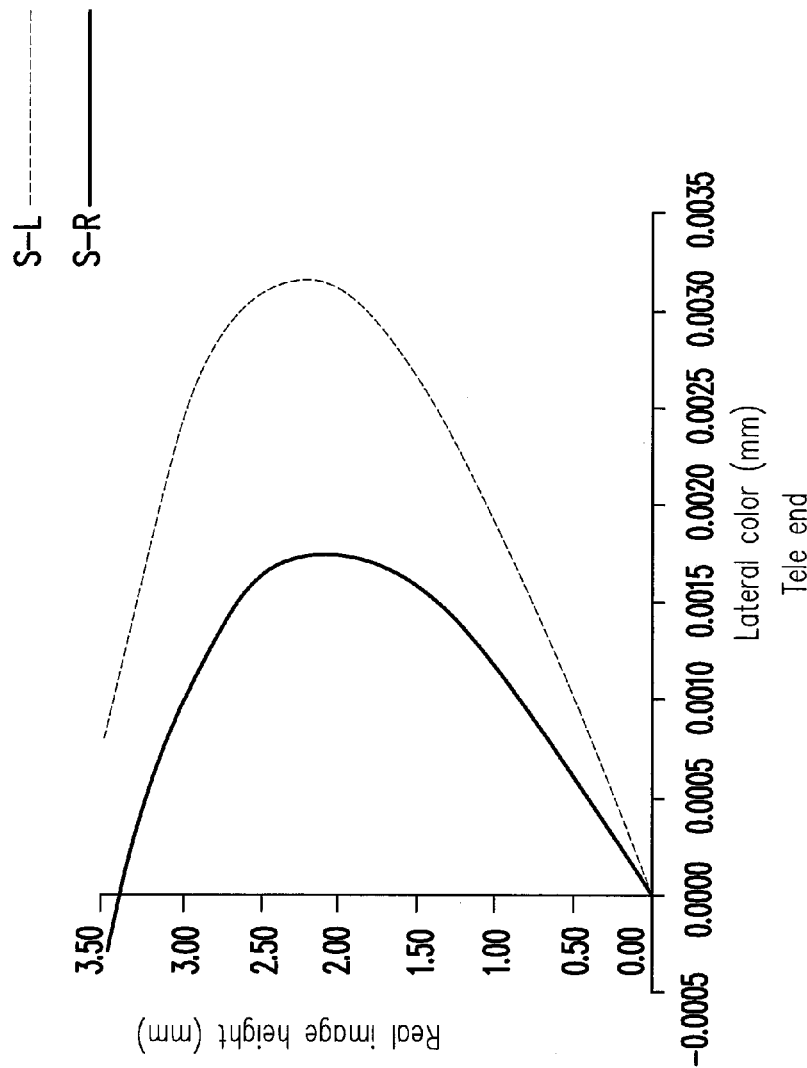

FIG. 5A through FIG. 5B are respectively schematic diagrams illustrating a zoom lens at a wide end and at a tele end according to yet another embodiment of the invention. With reference to FIG. 5A through FIG. 5B, a zoom lens 500 of the embodiment is similar to the zoom lens 100 illustrated in FIG. 1A through FIG. 1B, and the difference therebetween is described as follows. In the zoom lens 500, refractive powers of a first lens 511, a second lens 512 and a third lens 513 of the first lens group 510 are negative, negative and positive, respectively. To be more specific, in the embodiment, each of the first lens 511, the second lens 512 and the third lens 513 of the first lens group 510 is a spherical lens. Moreover, in the embodiment, the first lens 511, the second lens 512 and the third lens 513 are respectively a biconcave lens, a biconcave lens and a concave-convex lens having a concave surface (S508) facing the image side. Moreover, in the embodiment, an Abbe number of the first lens 511 is greater than 70, and the second lens 512 and the third lens 513 forms a second cemented lens D511, but the invention is not limited thereto.

On the other hand, in the embodiment, the fourth lens 521 of the second lens group 520 is a concave-convex lens having a concave surface (S512) facing the image side and is also an aspheric lens. Moreover, the zoom lens 500 of the embodiment further satisfies −1.4<f1/fw<−1.0 and 0.8<|f1/f2|<1.2, where f1 is an effective focal length of the first lens group 510, fw is an effective focal length of the zoom lens 500 at the wide end, and f2 is an effective focal length of the second lens group 520. In the embodiment, the operation mechanism of the first lens group 510 and the second lens group 520 is the same as that of the first lens group 110 and the second lens group 120 of the embodiment illustrated in FIG. 1, and related details may be referred to the above, which will not be repeatedly hereinafter.

On the other hand, with reference to FIG. 5A to FIG. 5B, the zoom lens 500 of the embodiment further includes a third lens group 540. The third lens group 540 has a positive refractive power and is disposed between the object side and the first lens group 510. To be more specific, the third lens group 540 includes a tenth lens 541 and an eleventh lens 542 in sequence from the object side to the image side, and refractive powers of the tenth lens 541 and the eleventh lens 542 are positive and negative, respectively. To be detailed, in the embodiment, each of the tenth lens 541 and the eleventh lens 542 is a spherical lens. To be more detailed, the tenth lens 541 and the eleventh lens 542 are respectively a biconvex lens and a convex-concave lens having a convex surface (S503) facing the image side. The tenth lens 541 and the eleventh lens 542 forms a third double cemented lens D541, but the invention is not limited thereto.

Furthermore, in the embodiment, the third lens group 540 has a fixed position relative to the zoom lens 500. When the zoom lens 500 is switched to the wide end, the zoom lens 500 satisfies D/TTL>0.45, where D is a distance from the aperture stop 131 to the image plane SI of the image side, TTL is a distance from an intersection point $P_3$ intersected between the surface S501 of the tenth lens 541 facing the object side and an optical axis L of the zoom lens 500 to the image plane SI. By doing so, the thickness of the zoom lens 500 may be limited so as to reduce the volume of the zoom lens 500.

Besides, structures of the zoom lens 500 of the embodiment and the zoom lens 100 are similar, so that the zoom lens 500 also has the advantages that the zoom lens 100 has, and detailed description thereof is not repeated.

Likewise, an embodiment of the zoom lens 500 is provided below though data provided below is not used for limiting the invention, and those skilled in the art may suitably modify parameters or settings of the following embodiment with reference of the invention without departing from the scope or spirit of the invention.

TABLE 7

| Surface | Radius of Curvature (mm) | Interval (mm) | Refractive Index | Abbe Number | Remarks |
|---|---|---|---|---|---|
| Object side | Infinity | Infinity | | | |
| S501 | 29.31 | 4.68 | 1.85 | 41.7 | Tenth lens |
| S502 | −33.27 | 0.80 | 1.92 | 18.9 | Eleventh lens |
| S503 | −469.90 | Variable interval (d4, not shown) | | | |
| S504 | −49.82 | 0.80 | 1.50 | 81.5 | First lens |
| S505 | 9.98 | 2.64 | | | |
| S506 | −13.22 | 0.80 | 1.60 | 41.9 | Second lens |
| S507 | 14.83 | 2.28 | 1.92 | 18.9 | Third lens |
| S508 | 79.37 | Variable interval (d1) | | | |
| S509 | Infinity | 0.15 | 1.52 | 64.2 | Filter |
| S510 | Infinity | Variable interval (d2) | | | Aperture stop |
| S511 | 8.43 | 4.50 | 1.74 | 49.0 | Fourth lens |
| S512 | 260.80 | 1.18 | | | |
| S513 | 85.00 | 0.80 | 1.67 | 27.6 | Fifth lens |
| S514 | 5.97 | 3.73 | 1.50 | 81.5 | Sixth lens |
| S515 | −11.17 | 0.10 | | | |
| S516 | 30.47 | 0.91 | 1.75 | 23.9 | Seventh lens |
| S517 | 7.63 | 0.91 | | | |
| S518 | 8.13 | 4.50 | 1.86 | 22.5 | Eighth lens |
| S519 | 16.65 | Variable interval (d3) | | | |
| S520 | Infinity | 0.45 | 1.52 | 64.2 | Cover glass |
| S521 | Infinity | 1.00 | | | |
| S522 | Infinity | 0.00 | | | Image sensing device |

In Table 7, the radius of curvature represents a radius of curvature of each surface, and the interval represents a distance between two adjacent surfaces. For example, an interval of the surface S501 represents a distance between the surface S501 and the surface S502. The thickness, the refractive index, and the Abbe number of each lens in the remark column correspond to values of the refractive index and the Abbe number in the same row. Moreover, the surface S501 is a surface of the tenth lens 541 facing the object side, the surface S502 is a surface of the tenth lens 541 contacting the eleventh lens 542, the surface S503 is a surface of the eleventh lens 542 facing the image side. The surfaces S504 and S505 are two surfaces of the first lens 511, the surface S506 is a surface of the second lens 512 facing to the object side, the surface S507 is a surface of the second lens 512 contacting the third lens 513, and the surface S508 is a surface of the third lens 513 facing the image side. The surfaces S509 and S510 are two surfaces of the filter 130, and the surface S510 is a surface of the aperture stop 131. The surfaces S511 and S512 are two surfaces of the fourth lens 521, the surface S513 is a surface of the fifth lens 122 facing the object side, the surface S514 is a surface of the fifth lens 122 contacting the sixth lens 123, the surface S515 is a surface of the sixth lens 123 facing the image side, the surfaces 5516 and S517 are two surfaces of the seventh lens 124, and the surfaces S518 and S519 are two surfaces of the eighth lens 125. The surfaces S520 and S521 are two surfaces of the cover glass 150. In the embodiment, when the zoom lens 500 is used for imaging, the image sensing device 160 may be disposed at the image side. The cover glass 150 is used to protect the image sensing device 160, and the surface S522 is the image plane SI of the image sensing device 160. Moreover, in the embodiment, the image sensing device 160 is, for example, a CCD or a CMOS image sensing device.

Accordingly, the surfaces S511 and S512 are aspheric surfaces, and a formula applied thereto is the same as the formula applied to Table 1 in the above, where the physical meaning of each parameter may be referred to the description with respect to Table 1 and will not be repeated hereinafter. Aspheric coefficients and each parameter of the surfaces S511 and S512 are shown in Table 8 as follows:

TABLE 8

| Surface | K | A | B | C | D |
|---|---|---|---|---|---|
| S511 | 0 | 1.228E−05 | 2.200E−06 | −2.938E−08 | 2.489E−09 |
| S512 | 0 | 5.200E−04 | 6.675E−06 | −1.188E−07 | 1.264E−08 |

In Table 9, values of the zoom lens 500 when the focal length thereof corresponds to the wide end and the tele end are listed, which include effective focal lengths, FOVs, F-numbers and variable intervals d1, d2 and d3.

TABLE 9

| | | Wide end | Tele end |
|---|---|---|---|
| Effective focal length (mm) | | 8 | 22 |
| F-Number | | 1.6 | 2 |
| Field of View (degree) | | 50 | 18.4 |
| Variable Interval (mm) | d1 | 9.33 | 1.36 |
| | d2 | 3.78 | 1.30 |
| | d3 | 4.66 | 7.14 |
| | d4 | 0.42 | 8.38 |

Referring to Table 9, since the F-number of the zoom lens 500 of the embodiment may be as small as 1.6, the zoom lens 500 has the advantage of the large aperture. Moreover, since the effective focal length of the zoom lens zoom lens 500 may reach 8-22 mm, the zoom lens 100 has the advantage of the long depth of field.

FIG. 6A through FIG. 6D are respectively graphs showing simulated optical data of the zoom lens of FIG. 5A when the zoom lens is at the wide end. FIG. 6E through FIG. 6H are respectively graphs showing simulated optical data of the zoom lens of FIG. 5B when the zoom lens is at the tele end. Moreover, FIG. 6A through FIG. 6H are graphs showing the simulated optical data performed by using light having a wavelength of 587 nm. Referring to the longitudinal spherical aberration graphs shown in FIG. 6A and FIG. 6E, the longitudinal axis shows image heights, where a position having the image height of 1 represents a position of the maximum field. Additionally, referring to the astigmatic field curve graphs shown in FIG. 6B and FIG. 6F, S represents data in a sagittal direction, while T represents data in a tangential direction. Referring to the lateral color graphs shown in FIG. 6D and FIG. 6H, a short-long (S-L) line represents a difference between a short wavelength of 486 nm and a long wavelength of 656 nm, while a short-ref (S-R) line represents a difference between the short wavelength of 486 nm and a reference wavelength of 587 nm. Referring to FIG. 6A through 6H, the zoom lens 500 could have good imaging quality in all of the aspects of longitudinal spherical aberration, distortion, astigmatic field curves and lateral color when the focal length thereof is at both of the tele end and the wide end. Accordingly, the zoom lens 500 of the embodiment could achieve the advantages of having small volume and low cost under the premise of the good imaging quality being maintained.

Figure 7A:
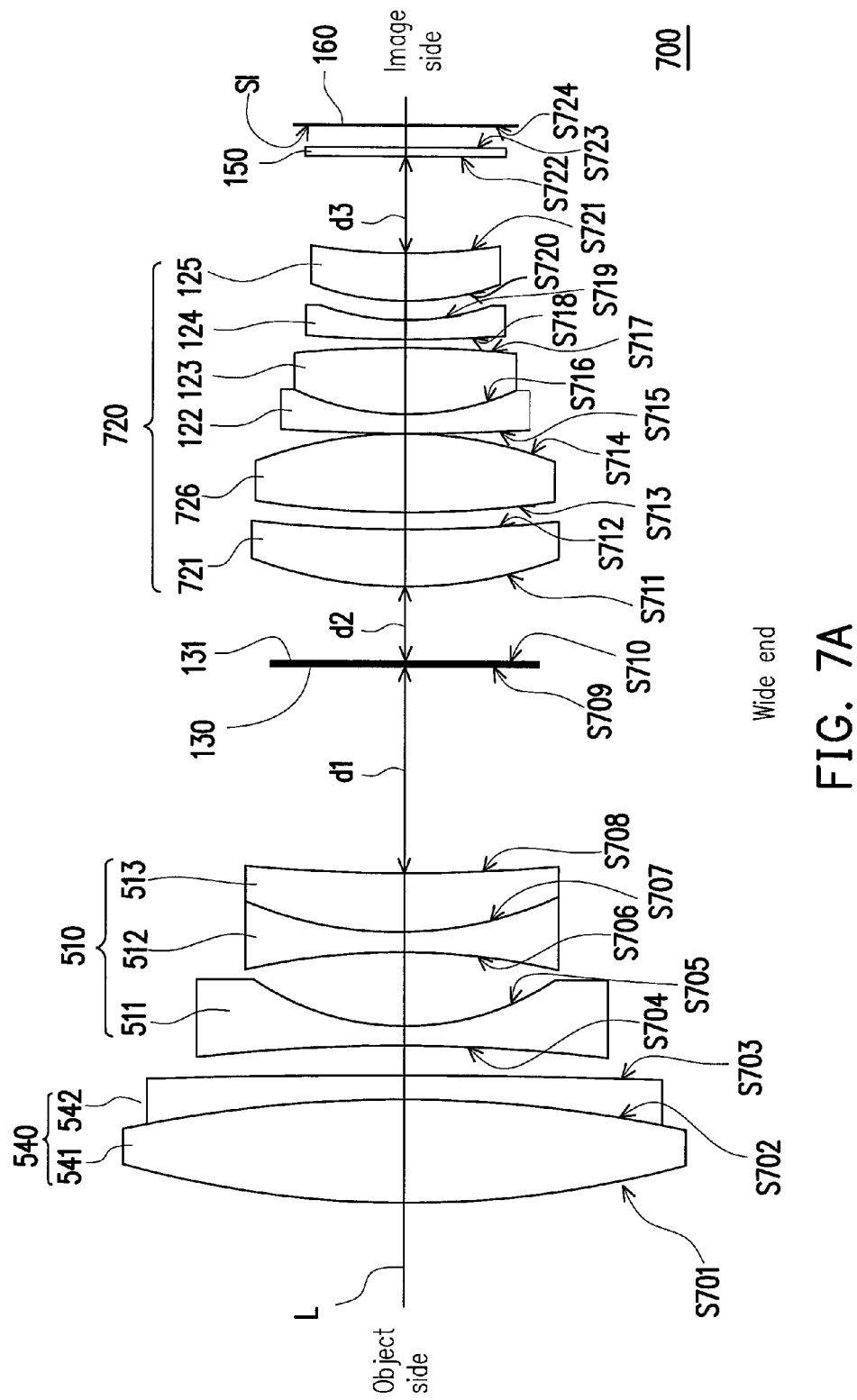
FIG. 7A through FIG. 7B are respectively schematic diagrams illustrating a zoom lens at a wide end and at a tele end according to still another embodiment of the invention.
Figure 7B:
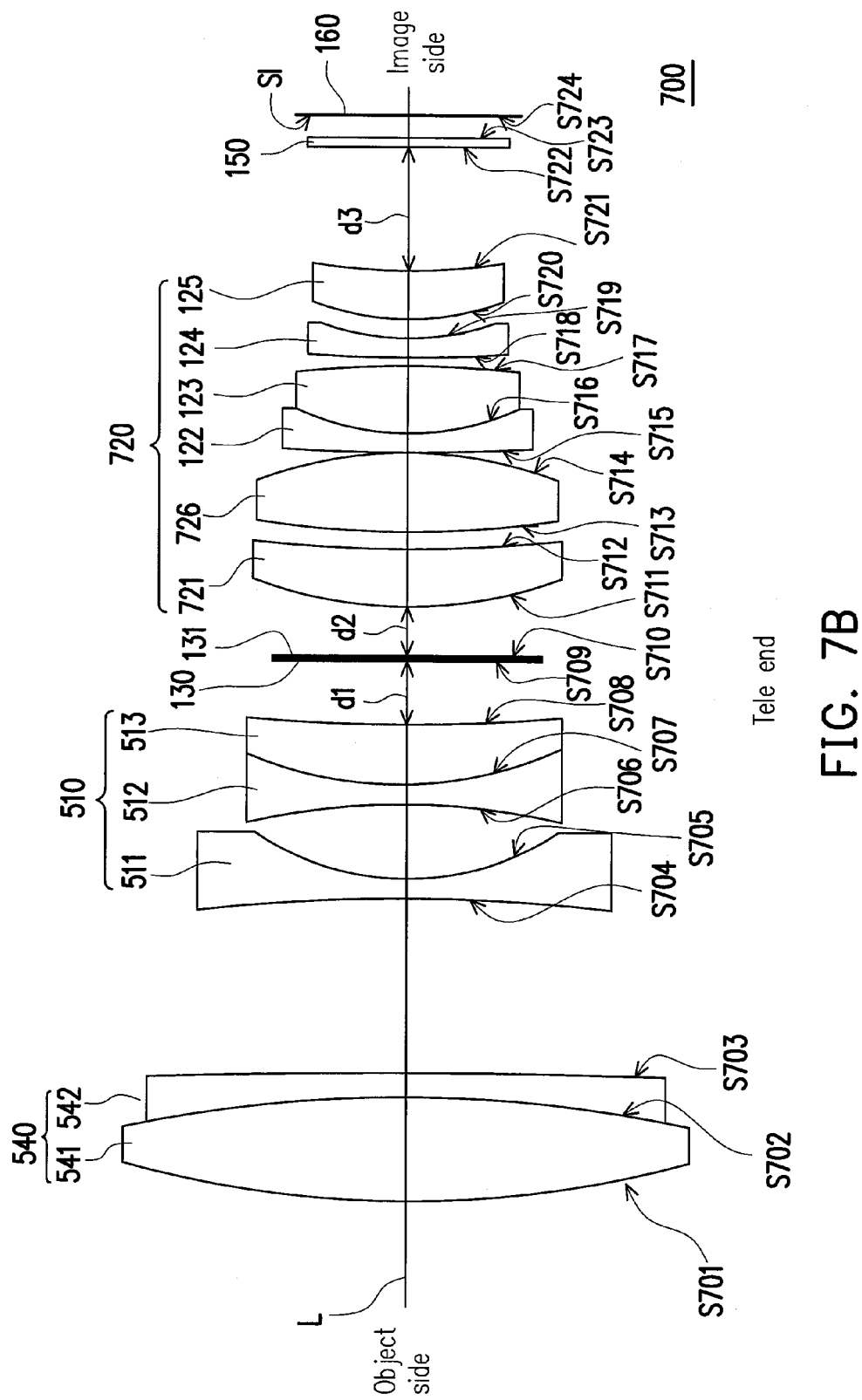
Figures 8A, 8B, 8C:
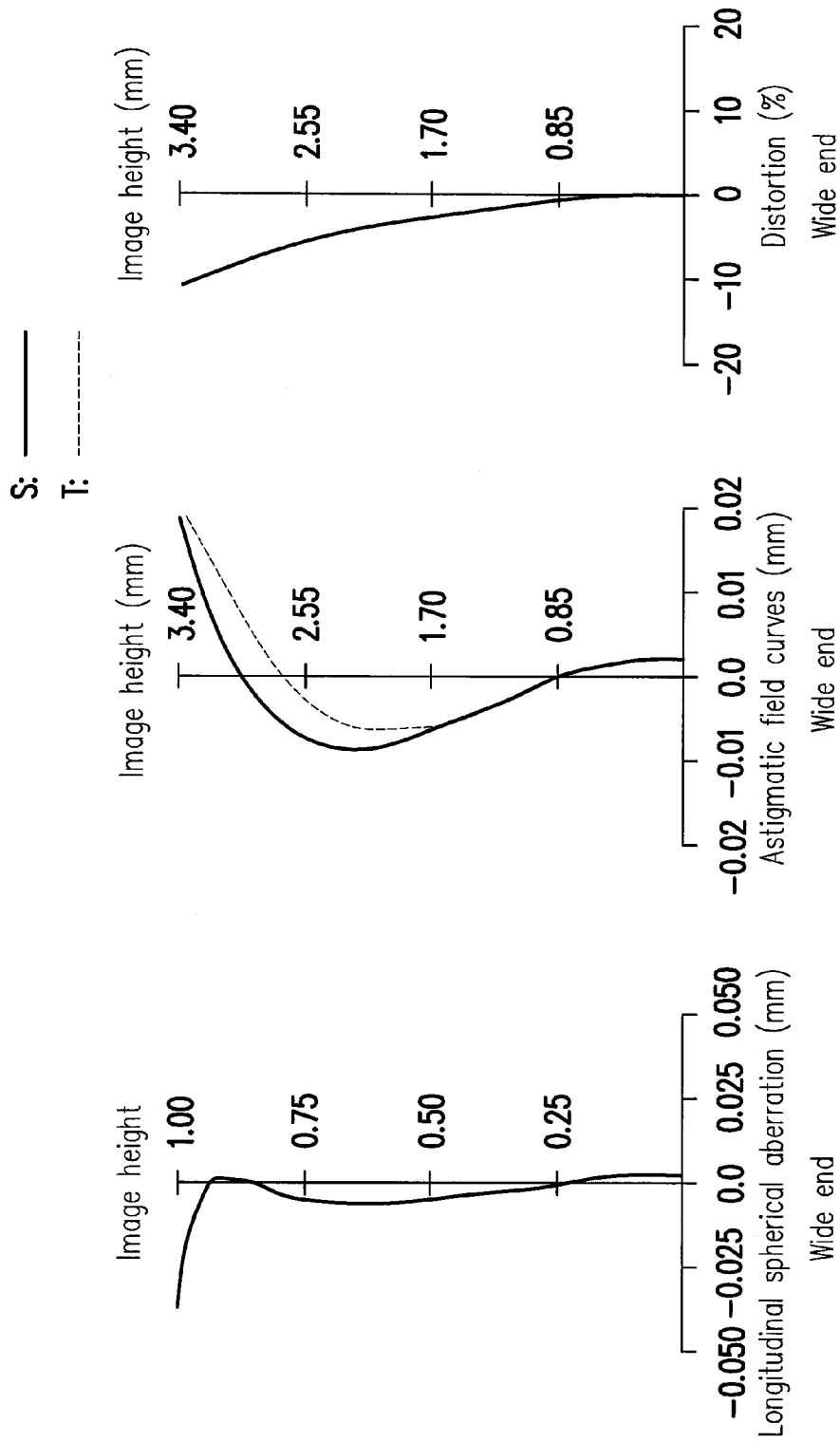
FIG. 8A through FIG. 8D are respectively graphs showing simulated optical data of the zoom lens of FIG. 7A when the zoom lens is at the wide end.
Figure 8D:
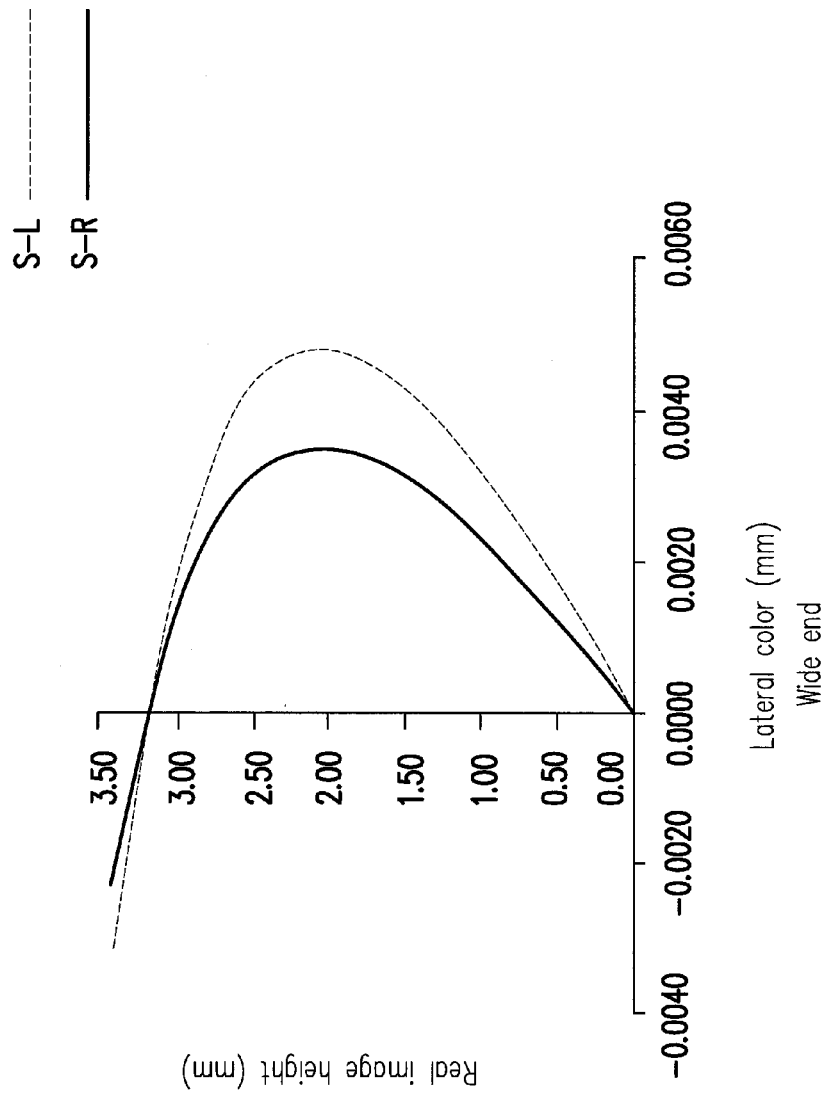
Figure 8H:
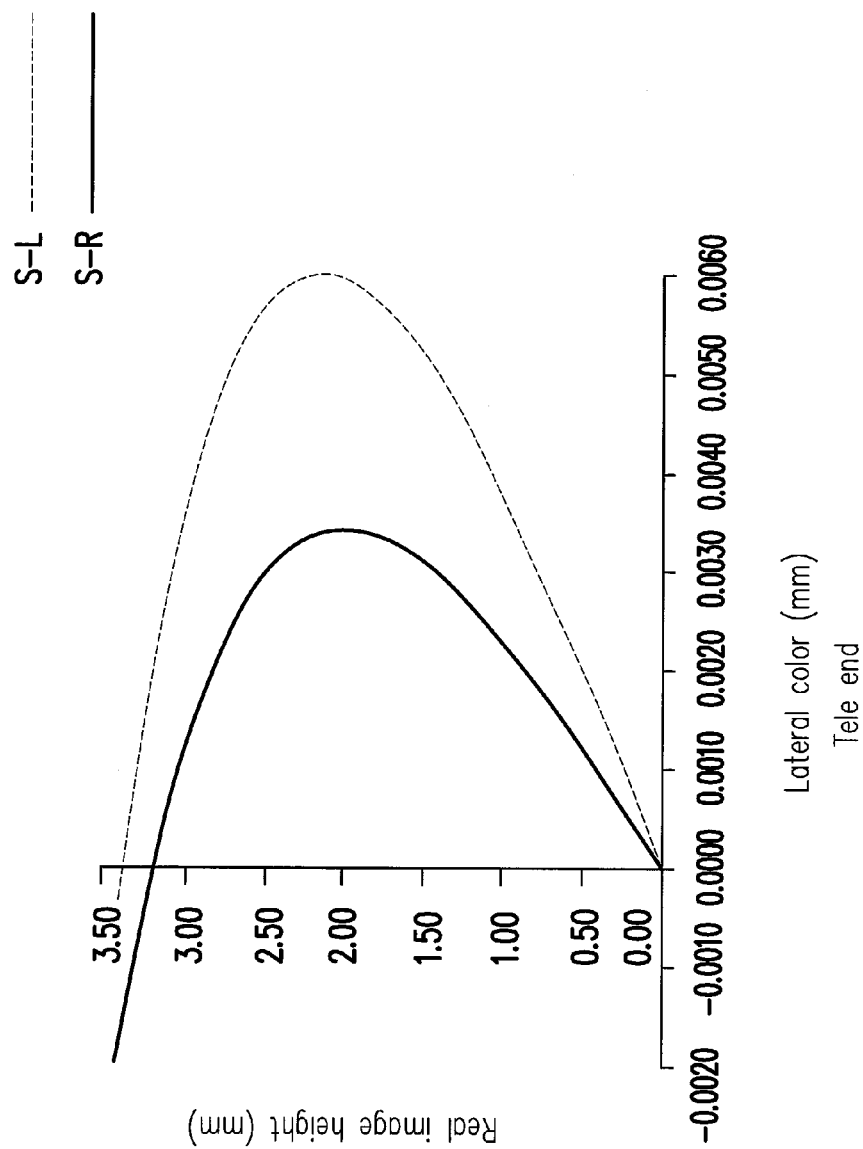

FIG. 7A through FIG. 7B are respectively schematic diagrams illustrating a zoom lens at a wide end and at a tele end according to still another embodiment of the invention. With reference to FIG. 7A through FIG. 7B, a zoom lens 700 of the embodiment is similar to the zoom lens 500 illustrated in FIG. 5A through FIG. 5B, and the difference therebetween is described as follows. In the zoom lens 700 of the embodiment, both a first lens 511 and a second lens 512 of a first lens group 510 have Abbe numbers greater than 70, and a fourth lens 721 of a second lens group 720 is an aspheric lens of a biconvex lens, but the invention is not limited thereto. Additionally, in the embodiment, the second lens group 720 further includes a ninth lens 726 disposed between the fourth lens 721 and the fifth lens 122. The ninth lens 726 has a positive refractive power and is a spherical lens. For instance, in the embodiment, the ninth lens 726 is, for example, a biconvex lens, but the invention is not limited thereto.

In addition, in the embodiment, the operation mechanism of the first lens group 510 and the second lens group 720 is similar to that of the first lens group 110 and the second lens group 120 of the embodiment illustrated in FIG. 1, and thus, related details thereof may be referred to in the above description, which will not be repeatedly hereinafter. Besides, structures of the zoom lens 700 of the embodiment and the zoom lens 500 are similar, so that the zoom lens 700 also has the advantages that the zoom lens 500 has, and detailed description thereof is not repeated.

Likewise, an embodiment of the zoom lens 700 is provided below though data provided below is not used for limiting the invention, and those skilled in the art may suitably modify parameters or settings of the following embodiment with reference of the invention without departing from the scope or spirit of the invention.

TABLE 10

| Surface | Radius of Curvature (mm) | Interval (mm) | Refractive Index | Abbe Number | Remarks |
|---|---|---|---|---|---|
| Object side | Infinity | Infinity | | | |
| S701 | 23.89 | 4.65 | 1.71 | 53.9 | Tenth lens |
| S702 | −29.85 | 1.00 | 1.81 | 25.4 | Eleventh lens |
| S703 | −637.10 | Variable interval (d4, not shown) | | | |
| S704 | −51.06 | 0.80 | 1.44 | 94.9 | First lens |
| S705 | 6.88 | 3.52 | | | |
| S706 | −16.24 | 0.80 | 1.50 | 81.5 | Second lens |
| S707 | 8.80 | 2.56 | 1.83 | 37.2 | Third lens |
| S708 | 26.46 | Variable interval (d1) | | | |
| S709 | Infinity | 0.15 | 1.52 | 64.2 | Filter |
| S710 | Infinity | Variable interval (d2) | | | Aperture stop |
| S711 | 10.35 | 2.57 | 1.74 | 49.0 | Fourth lens |
| S712 | −194.96 | 0.78 | | | |
| S713 | 24.16 | 3.43 | 1.44 | 94.9 | Ninth lens |
| S714 | −9.73 | 0.10 | | | |
| S715 | 62.51 | 0.80 | 1.76 | 27.5 | Fifth lens |
| S716 | 5.66 | 3.12 | 1.50 | 81.5 | Sixth lens |
| S717 | −36.07 | 0.43 | | | |
| S718 | 63.45 | 0.80 | 1.76 | 26.5 | Seventh lens |
| S719 | 6.28 | 1.03 | | | |
| S720 | 7.28 | 2.07 | 1.92 | 20.9 | Eighth lens |
| S721 | 19.14 | Variable interval (d3) | | | |
| S722 | Infinity | 0.45 | 1.52 | 64.2 | Cover glass |
| S723 | Infinity | 1.00 | | | |
| S724 | Infinity | 0.00 | | | Image sensing device |

In Table 10, the radius of curvature represents a radius curvature of each surface, and the interval represents a distance between two adjacent surfaces. For example, an interval of the surface S701 represents a distance between the surface S701 and the surface S702. The thickness, the refractive index, and the Abbe number of each lens in the remark column correspond to values of the refractive index and the Abbe number in the same row. Moreover, the surface S701 is a surface of the tenth lens 541 facing the object side, the surface S702 is a surface of the tenth lens 541 contacting the eleventh lens 542, and the surface S703 is a surface of the eleventh lens 542 facing the image side. The surfaces S704 and S705 are two surfaces of the first lens 511, the surface S706 is a surface of the second lens 512 facing the object side, the surface S707 is a surface of the second lens 512 contacting the third lens 513, and the surface S708 is a surface of the third lens 513 facing the image side. The surfaces S709 and S7510 are two surfaces of the filter 130, and the surface S710 is a surface of the aperture stop 131. The surfaces S711 and S712 are two surfaces of the fourth lens 721. The surfaces S713 and S714 are two surfaces of the ninth lens 726. The surface S715 is a surface of the fifth lens 122 facing the object side, the surface S716 is a surface of the fifth lens 122 contacting the sixth lens 123, the surface S717 is a surface of the sixth lens 123 facing the image side, the surfaces S718 and S719 are two surfaces of the seventh lens 124, and the surfaces S720 and S721 are two surfaces of the eighth lens 125. The surfaces S722 and S723 are two surfaces of the cover glass 150. In the embodiment, when the zoom lens 700 is used for imaging, the image sensing device 160 is disposed at the image side. The cover glass 150 is used to protect the image sensing device 160, and the surface S724 is the image plane SI of the image sensing device 160. Moreover, in the embodiment, the image sensing device 160 is, for example, a CCD or a CMOS image sensing device.

Accordingly, the surfaces S711 and S712 are aspheric surfaces, and a formula applied thereto is the same as the formula applied to Table 1 in the above, where the physical meaning of each parameter may be referred to the description with respect to Table 1 and will not be repeated hereinafter. Aspheric coefficients and each parameter of the surfaces S711 and S712 are shown in Table 11 as follows:

TABLE 11

| Surface | K | A | B | C | D |
|---|---|---|---|---|---|
| S711 | 0 | 2.865E−05 | 5.839E−07 | 1.893E−07 | −7.048E−09 |
| S712 | 0 | 4.778E−04 | 3.212E−06 | 2.954E−07 | −1.022E−08 |

In Table 12, values of the zoom lens 700 when the focal length thereof corresponds to the wide end and the tele end include effective focal lengths, FOVs, F-numbers and variable intervals d1, d2 and d3.

TABLE 12

| | | Wide end | Tele end |
|---|---|---|---|
| Effective focal length (mm) | | 8 | 22 |
| F number | | 1.6 | 2 |
| Field of View (degree) | | 49 | 18.3 |
| Variable interval (mm) | d1 | 9.61 | 1.86 |
| | d2 | 3.52 | 1.00 |
| | d3 | 4.31 | 6.83 |
| | d4 | 1.50 | 9.26 |

Referring to Table 12, since the F-number of the zoom lens 700 of the embodiment may be as small as 1.6, the zoom lens 700 has the advantage of the large aperture. Moreover, since the effective focal length of the zoom lens 700 may reach 8-22 mm, the zoom lens 700 has the advantage of the long depth of field.

FIG. 8A through FIG. 8D are respectively graphs showing simulated optical data of the zoom lens of FIG. 7A when the zoom lens is at the wide end. FIG. 8E through FIG. 8H are respectively graphs showing simulated optical data of the zoom lens of FIG. 7B when the zoom lens is at the tele end. Moreover, FIG. 8A through FIG. 8H are graphs showing the simulated optical data performed by using light having a wavelength of 587 nm. Referring to the longitudinal spherical aberration graphs shown in FIG. 8A and FIG. 8E, the longitudinal axis shows image heights, where a position having the image height of 1 represents a position of the maximum field. Additionally, referring to the astigmatic field curve graphs shown in FIG. 8B and FIG. 8F, S represents data in a sagittal direction, while T represents data in a tangential direction. Referring to the later color graphs shown in FIG. 8D and FIG. 8H, the short-long (S-L) line represents a difference between a short wavelength of 486 nm and a long wavelength of 656 nm, while the short-ref (S-R) line represents a difference between the short wavelength of 486 nm and a reference wavelength of 587 nm. Referring to FIG. 8A through 8H, the zoom lens 700 could have good imaging quality in all of the aspects of longitudinal spherical aberration, distortion, astigmatic field curves and lateral color when the focal length thereof is at both of the tele end and the wide end. Accordingly, the zoom lens 700 of the embodiment could achieve the advantages of having small volume and low cost under the premise of the good imaging quality being maintained.

Based on the above, in the zoom lens provided by the embodiments of the invention, by using the first lens group and the second lens group together which respectively have a negative and a positive refractive powers and the collocation of the first lens group and the second lens group, the image aberration and chromatic aberration may be mitigated. In addition, during a zoom process, since a design of a linking-up mechanism is relatively simple, so that not only can the cost be reduced, but the zoom lens can have the advantage of being small-volume. On the other hand, according to the embodiments of the invention, the F-number may be as small as 1.6 and the effective focal length of the zoom lens may reach 8-22 mm, the zoom lens could have the advantages of the large aperture and the long depth of field. Further, in the embodiment, a few of aspheric lenses and low dispersion glasses are used by the zoom lens with no extra low dispersion glass (ED glass), the cost spent on lenses could be saved so as to improve the production yield of the zoom lens.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A zoom lens, comprising:
   a first lens group, having a negative refractive power and comprising a first lens, a second lens and a third lens arranged from an object side to an image side, wherein an Abbe Number of at least one of the first lens, second lens and the third lens is greater than 70, and the first lens has a concave surface facing the object side, wherein the first lens is a lens with a refractive power closest to the object side of all lenses within the zoom lens; and a second lens group, having a positive refractive power, disposed between the first lens group and the image side and comprising a fourth lens, a fifth lens, a sixth lens, a seventh lens and a eighth lens arranged from the object side to the image side, wherein the zoom lens satisfies $-2.4<f1/f_w<-1.0$, where f1 is an effective focal length of the first lens group, and $f_w$ is an effective focal length of the zoom lens at a wide end.

2. The zoom lens according to claim 1, further comprising an aperture stop disposed between the first lens group and the second lens group and having a fixed position relative to the zoom lens, wherein the first lens group and the second lens group are moving relative to the aperture stop to allow the zoom lens to be switched between the wide end and the tele end, the second lens group is moving to zoom, and the first lens group is moving to focus.

3. The zoom lens according to claim 1, wherein refractive powers of the first lens, the second lens, the third lens are positive, negative and negative, respectively.

4. The zoom lens according to claim 3, wherein the first lens, the second lens and the third lens are respectively a concave-convex lens having the concave surface facing the object side, a biconcave lens and a convex-concave lens having a convex surface facing the image side.

5. The zoom lens according to claim 3, wherein the first lens, the second lens and the third lens are respectively a concave-convex lens having the concave surface facing the object side, a biconcave lens and a biconcave lens.

6. The zoom lens according to claim 3, wherein the zoom lens satisfies $-2.4<f1/f_w<-1.9$, where f1 is an effective focal length of the first lens group, and $f_w$ is an effective focal length of the zoom lens at the wide end.

7. The zoom lens according to claim 3, wherein the zoom lens satisfies $1.3<|f1/f2|<1.7$, where f1 is an effective focal length of the first lens group, and f2 is an effective focal length of the second lens group.

8. The zoom lens according to claim 2, wherein the zoom lens satisfies $D/TTL_W>0.65$ and $D/TTL_T>0.75$, where D is the distance between the aperture stop to an image plane located at the image side, $TTL_W$ is a distance from an intersection point intersected between a surface of the first lens facing to the object side and an optical axis of the zoom lens to the image plane when the zoom lens is switched to the wide end, and $TTL_T$ is a distance from the intersection point intersected between the surface of the first lens facing to the object side and the optical axis of the zoom lens to image plane when the zoom lens is switched to the tele end.

9. The zoom lens according to claim 1, wherein the second lens group further comprises a ninth lens disposed between the fourth lens and the fifth lens and having a positive refractive power.

10. The zoom lens according to claim 9, wherein the ninth lens is a biconvex lens.

11. A zoom lens, comprising:
a first lens group, having a negative refractive power and comprising a first lens, a second lens and a third lens arranged in order from an object side to an image side, wherein an Abbe Number of at least one of the first lens, the second lens and the third lens is greater than 70, and the first lens has a concave surface facing the object side, wherein refractive powers of the first lens, the second lens, the third lens are positive, negative and negative, respectively; and a second lens group, having a positive refractive power, disposed between the first lens group and the image side and comprising a fourth lens, a fifth lens, a sixth lens, a seventh lens and a eighth lens arranged from the object side to the image side, wherein the zoom lens satisfies $-2.4<f1/f_w<-1.0$, where f1 is an effective focal length of the first lens group, and $f_w$ is an effective focal length of the zoom lens at a wide end.

12. A zoom lens, comprising:
a first lens group, having a negative refractive power and comprising a first lens, a second lens and a third lens arranged from an object side to an image side, wherein an Abbe Number of at least one of the first lens, the second lens and the third lens is greater than 70, and the first lens has a concave surface facing the object side;

a second lens group, having a positive refractive power, disposed between the first lens group and the image side and comprising a fourth lens, a fifth lens, a sixth lens, a seventh lens and a eighth lens arranged from the object side to the image side, wherein the zoom lens satisfies $-2.4<f1/f_w<-1.0$, where f1 is an effective focal length of the first lens group, and $f_w$ is an effective focal length of the zoom lens at a wide end; and a third lens group, disposed between the object side and the first lens group, and having at most two lenses, wherein the third lens group has a fixed position in the zoom lens and is in the fixed position when the zoom lens switches between the wide end and a tele end, wherein an Abbe Number of each lens of the third lens group is less than or equal to 53.9 and greater than or equal to 18.9.

13. The zoom lens according to claim 12, wherein refractive powers of the first lens, the second lens, the third lens are negative, negative and positive, respectively.

14. The zoom lens according to claim 13, wherein the first lens, the second lens and the third lens are respectively a biconcave lens, a biconcave lens and a concave-convex lens having a concave surface facing the image side.

15. The zoom lens according to claim 13, wherein the third lens group has a positive refractive power, and the at most two lenses comprises a ninth lens and a tenth lens from the object side to the image side, and refractive powers of the ninth lens and the tenth lens are positive and negative, respectively.

16. The zoom lens according to claim 15, wherein each of the ninth lens and the tenth lens is a spherical lens.

17. The zoom lens according to claim 15, wherein the ninth lens and the tenth lens are respectively a biconvex lens and a convex-concave lens having a convex surface facing the image side.

18. The zoom lens according to claim 15, wherein the zoom lens satisfies $-1.4<f1/f_w<-1.0$, where f1 is an effective focal length of the first lens group, and $f_w$ is an effective focal length of the zoom lens at the wide end.

19. The zoom lens according to claim 15, wherein the zoom lens satisfies $0.8<|f1/f2|<1.2$, where f1 is an effective focal length of the first lens group, and f2 is an effective focal length of the second lens group.

20. The zoom lens according to claim 15, the zoom lens further comprising an aperture stop between the first lens group and the second lens group, wherein the zoom lens satisfies $D/TTL>0.45$, where D is a distance from the aperture stop to an image plane of the image side, and TTL is a distance from an intersection point intersected between a surface of the ninth lens facing the object side and an optical axis of the zoom lens to the image plane.

21. The zoom lens according to claim 1, wherein each of the first lens, the second lens and the third lens is a spherical lens, and at least one of the fourth lens, the fifth lens, the sixth lens, the seventh lens and the eighth lens is an aspheric lens.

22. The zoom lens according to claim 21, wherein the fourth lens is the aspheric lens.

23. The zoom lens according to claim 1, wherein the fourth lens, the fifth lens, the sixth lens, the seventh lens and the eighth lens are respectively a biconvex lens, a convex-concave lens having a convex surface facing the object side, a biconvex lens, a convex-concave lens having a convex surface facing the object side and a concave-convex lens having a concave surface facing the image side.

24. The zoom lens according to claim 1, wherein the fourth lens, the fifth lens, the sixth lens, the seventh lens and the eighth lens are respectively a concave-convex lens having a concave surface facing the image side, a convex-concave lens having a convex surface facing the object side, a biconvex lens, a biconcave lens and a concave-convex lens having a concave surface facing the image side.

25. The zoom lens according to claim 1, wherein the fourth lens, the fifth lens, the sixth lens, the seventh lens and the eighth lens are respectively a concave-convex lens having a concave surface facing the image side, a convex-concave lens having a convex surface facing the object side, a biconvex lens, a convex-concave lens having a convex surface facing the object side and a concave-convex lens having a concave surface facing the image side.

26. The zoom lens according to claim 1, wherein at least two adjacent lenses of the second lens group forms a double cemented lens, and an Abbe number of at least one of the at least two adjacent lenses is greater than 70.

27. The zoom lens according to claim 1, wherein the refractive powers of the fourth lens, the fifth lens, the sixth lens, the seventh lens and the eighth lens are positive, negative, positive, negative, positive, respectively.

* * * * *